(12) United States Patent
Silverbrook et al.

(10) Patent No.: US 7,088,420 B2
(45) Date of Patent: Aug. 8, 2006

(54) PRINTING SYSTEM WITH OPPOSED PRINTHEAD ASSEMBLIES FOR DOUBLE-SIDE PRINTING

(75) Inventors: Kia Silverbrook, Balmain (AU); Toby Allen King, Balmain (AU)

(73) Assignee: Silverbrook Research Pty Ltd, Balmain (AU)

( * ) Notice: Subject to any disclaimer, the term of this patent is extended or adjusted under 35 U.S.C. 154(b) by 0 days.

(21) Appl. No.: 11/209,710

(22) Filed: Aug. 24, 2005

(65) Prior Publication Data

US 2005/0280787 A1  Dec. 22, 2005

Related U.S. Application Data

(63) Continuation of application No. 10/760,211, filed on Jan. 1, 2004.

(51) Int. Cl.
*G03B 27/32* (2006.01)
*G03B 20/00* (2006.01)

(52) U.S. Cl. ............... 355/26; 355/28; 355/40; 355/54; 101/34; 101/226; 83/602; 83/620

(58) Field of Classification Search ............... None
See application file for complete search history.

(56) References Cited

U.S. PATENT DOCUMENTS

| | | | |
|---|---|---|---|
| 5,146,415 A | 9/1992 | Faris | |
| 5,847,836 A | 12/1998 | Suzuki | |
| 5,870,124 A | 2/1999 | Silverbrook | |
| 5,927,874 A | 7/1999 | Kikuta et al. | |
| 5,984,446 A | 11/1999 | Silverbrook | |
| 6,229,565 B1 | 5/2001 | Bobry | |
| 6,362,868 B1 | 3/2002 | Silverbrook | |
| 6,398,344 B1* | 6/2002 | Silverbrook et al. | 347/54 |
| 6,533,390 B1* | 3/2003 | Silverbrook | 347/42 |
| 6,583,852 B1 | 6/2003 | Baum et al. | |
| 6,663,304 B1* | 12/2003 | Vives et al. | 101/211 |
| 6,767,073 B1 | 7/2004 | Tschida | |
| 6,786,655 B1 | 9/2004 | Cook et al. | |
| 2002/0018654 A1 | 2/2002 | Keller et al. | |
| 2002/0162472 A1 | 11/2002 | Liguori et al. | |
| 2003/0043273 A1 | 3/2003 | Suzuki | |
| 2003/0210309 A1 | 11/2003 | Kimura et al. | |
| 2004/0135872 A1* | 7/2004 | Burdenko | 347/218 |
| 2005/0151768 A1* | 7/2005 | Merz et al. | 347/9 |

FOREIGN PATENT DOCUMENTS

EP 0961482 A2 12/1999
WO WO 2003/061269 A1 7/2003

* cited by examiner

*Primary Examiner*—D. Rutledge

(57) ABSTRACT

A printing system includes a support arrangement. A print cartridge receiving arrangement is mounted on the support arrangement to engage a print cartridge. A drive mechanism delivers print media from the print cartridge. A print engine is mounted on the support arrangement downstream of the print cartridge and has a pair of opposed printhead assemblies that are configured to perform double-sided printing on print media fed from the print cartridge between the printhead assemblies. A slitter is mounted on the support arrangement downstream of the print engine and is configured to separate the print media into sheets.

7 Claims, 25 Drawing Sheets

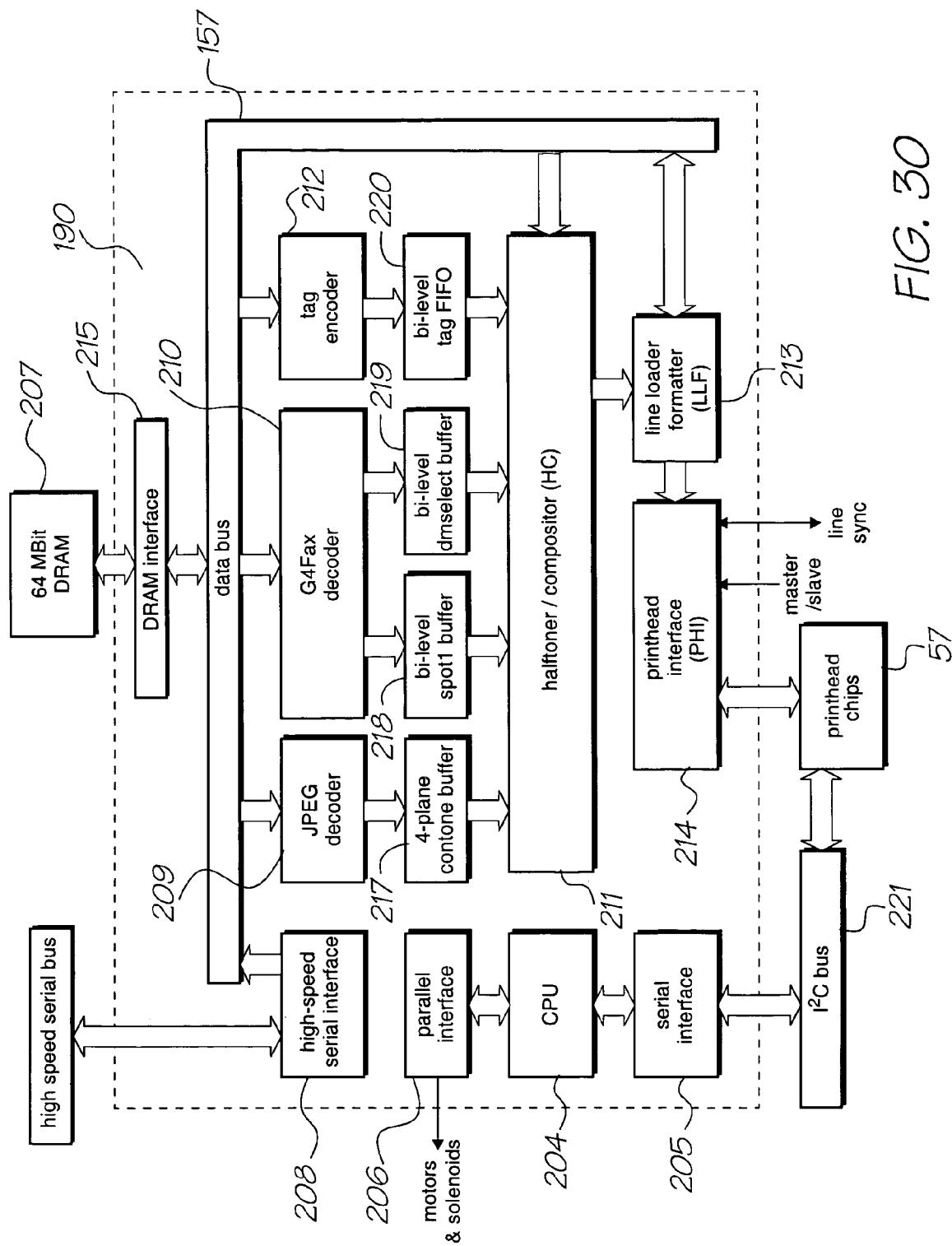

PRINTING SYSTEM WITH OPPOSED PRINTHEAD ASSEMBLIES FOR DOUBLE-SIDE PRINTING

CROSS-REFERENCE TO RELATED APPLICATIONS

This is a Continuation Application of U.S. application Ser. No. 10/760,211 filed on Jan. 21, 2004, all of which is herein incorporated by reference.

FIELD OF THE INVENTION

The invention relates to a printing system. More particularly, this invention relates to a printing system with opposed printhead assemblies for double-sided printing. This invention also relates to a hybrid photofinishing system that is one that provides for digital processing of digitally encoded photographic images and for chemical processing of exposed photographic film. In one of its possible embodiments, the photofinishing system provides for page-width printing of print media that is fed directly from a roll of the print media to a print head assembly.

CROSS-REFERENCE TO CO-PENDING APPLICATIONS

The following applications have been filed by the Applicant simultaneously with the present application:

| | | |
|---|---|---|
| 10/760230 | 10/760225 | 10/760224 |
| 6.991.098 | 10/760228 | 6.944.970 |
| 10/760215 | 10/760256 | 10/760257 |
| 10/760240 | 10/760251 | 10/760266 |
| 6.920.704 | 10/760193 | 10/760214 |
| 10/760260 | 10/760226 | 10/760269 |
| 10/760199 | 10/760241 | 10/760272 |
| 10/760273 | 10/760187 | 10/760182 |
| 10/760188 | 10/760218 | 10/760217 |
| 10/760216 | 10/760233 | 10/760246 |
| 10/760212 | 10/760243 | 10/760201 |
| 10/760185 | 10/760253 | 10/760255 |
| 10/760209 | 10/760208 | 10/760194 |
| 10/760238 | 10/760234 | 10/760235 |
| 10/760183 | 10/760189 | 10/760262 |
| 10/760232 | 10/760231 | 10/760200 |
| 10/760190 | 10/760191 | 10/760227 |
| 10/760207 | 10/760181 | 10/760254 |
| 10/760210 | 10/760202 | 10/760197 |
| 10/760198 | 10/760249 | 10/760263 |
| 10/760196 | 10/760247 | 10/760223 |
| 10/760264 | 10/760244 | 10/760245 |
| 10/760222 | 10/760248 | 10/760236 |
| 10/760192 | 10/760203 | 10/760204 |
| 10/760205 | 10/760206 | 10/760267 |
| 10/760270 | 10/760259 | 10/760271 |
| 10/760275 | 10/760274 | 10/760268 |
| 10/760184 | 10/760195 | 10/760186 |
| 10/760261 | 10/760258 | 10/760180 |
| 10/760229 | 10/760213 | 10/760219 |
| 10/760237 | 10/760221 | 10/760220 |
| 10/760252 | 10/760265 | |

The disclosures of these co-pending applications are incorporated herein by reference.

BACKGROUND OF THE INVENTION

Digital photofinishing systems are known and employ a variety of technologies, including laser exposure of photographic film, dye sublimation and inkjet printing using conventional types of printers. The present invention has been developed to provide for dual or hybrid digital processing of digitally encoded photographic images and chemical processing of exposed photographic film, and for page-width printing of print media that is fed directly from a roll of the media to a print head assembly, so as to facilitate application of the invention to photographic processing in the context of so-called Minilab photographic services.

SUMMARY OF THE INVENTION

Broadly defined, the present invention provides photofinishing system comprising:

a) a digital processor, a printer and means for feeding print media to the printer from a roll of the print media; the digital processor being arranged to receive digitised data that is representative of a photographic image and to process the data in a manner to generate a printer drive signal that is representative of the photographic image, the printer being coupled to the digital processor and being arranged to process the drive signal and effect printing of the photographic image on the print media as it is fed to the printer from the roll, and provided as an integrated component of the photofinishing system, b) means for providing controlled chemical development and subsequent printing of exposed photographic film.

In one embodiment of the invention images carried by developed film are scanned to produce a printer drive signal for feeding to the printer that is coupled to the digital processor The roll of print media is advantageously provided by way of a replaceable cartridge, which may also be employed to carry at least one reservoir of ink for the printer. In this embodiment of the invention the cartridge may be mounted removably to a mounting platform, to which the printer is also mounted, and, when so mounted, engage with a fixed drive system that may be energized when required to advance the print media toward the printer.

The invention will be more fully understood from the following description of an embodiment of a digital photofinishing system that incorporates an exemplified form of the invention. The description is provided with reference to the accompanying drawings.

BRIEF DESCRIPTION OF THE DRAWINGS

In the drawings:

FIG. 30 illustrates the architecture of the PEC of FIG. 29.

DETAILED DESCRIPTION OF EXEMPLARY EMBODIMENT

As illustrated schematically in FIG. 1, the digital photofinishing system (referred to hereinafter as a "photofinishing system") comprises a computer 20 which is arranged selectively to receive an input from an input source 21 which, although not specifically illustrated in FIG. 1, might typically comprise one or more of:
 a) A scanning device.
 b) A dedicated photo (film or print) scanning device.
 c) A computer disk.
 d) A digital camera output.
 e) A digital camera memory card.
 f) A digital file stored on a photographic negative or print.
 g) An internet (or intranet) connection.

Figure 2:
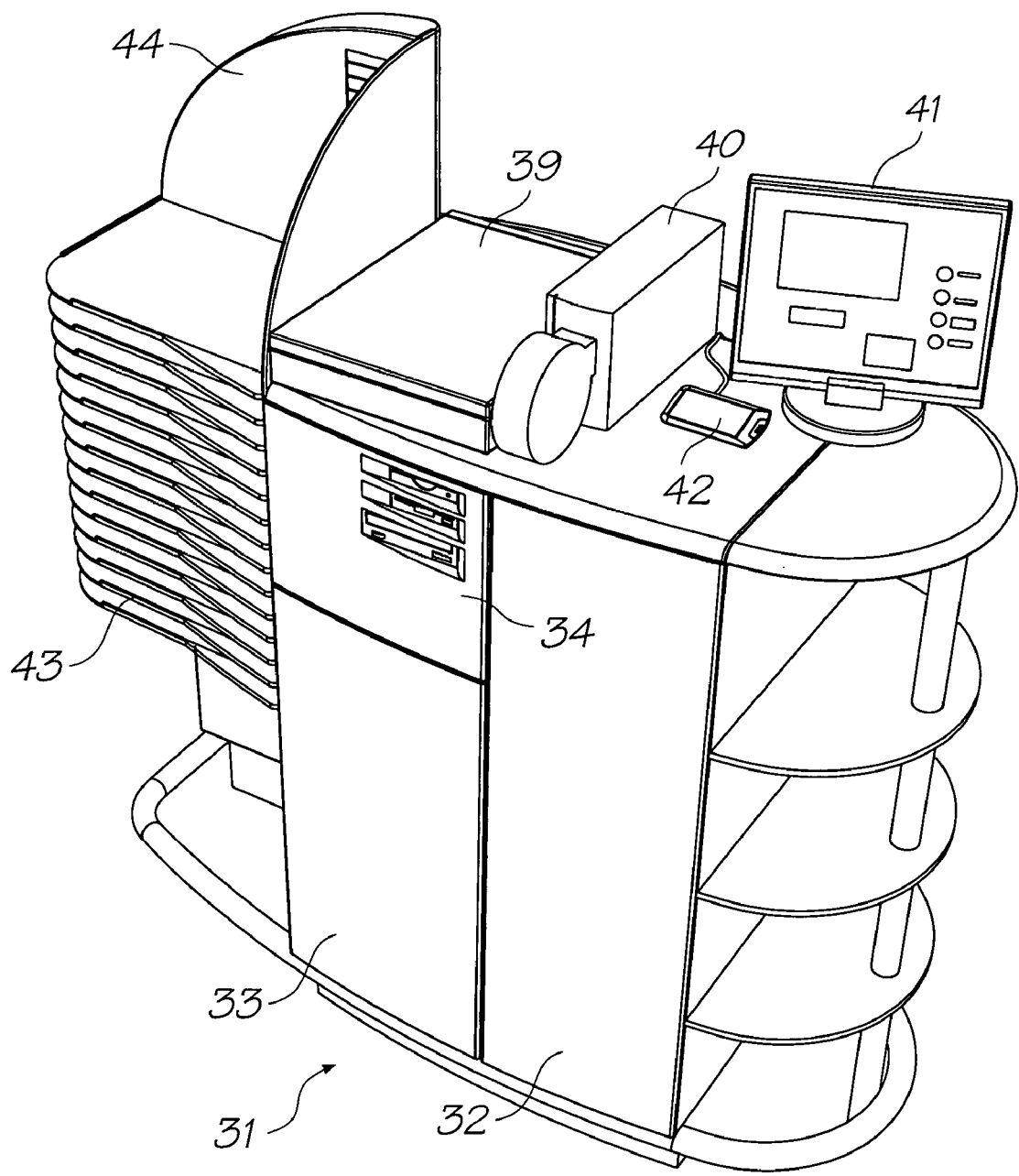
FIG. 2 shows in perspective cabinetry that mounts and contains components of the digital photofinishing system.
Figure 3:
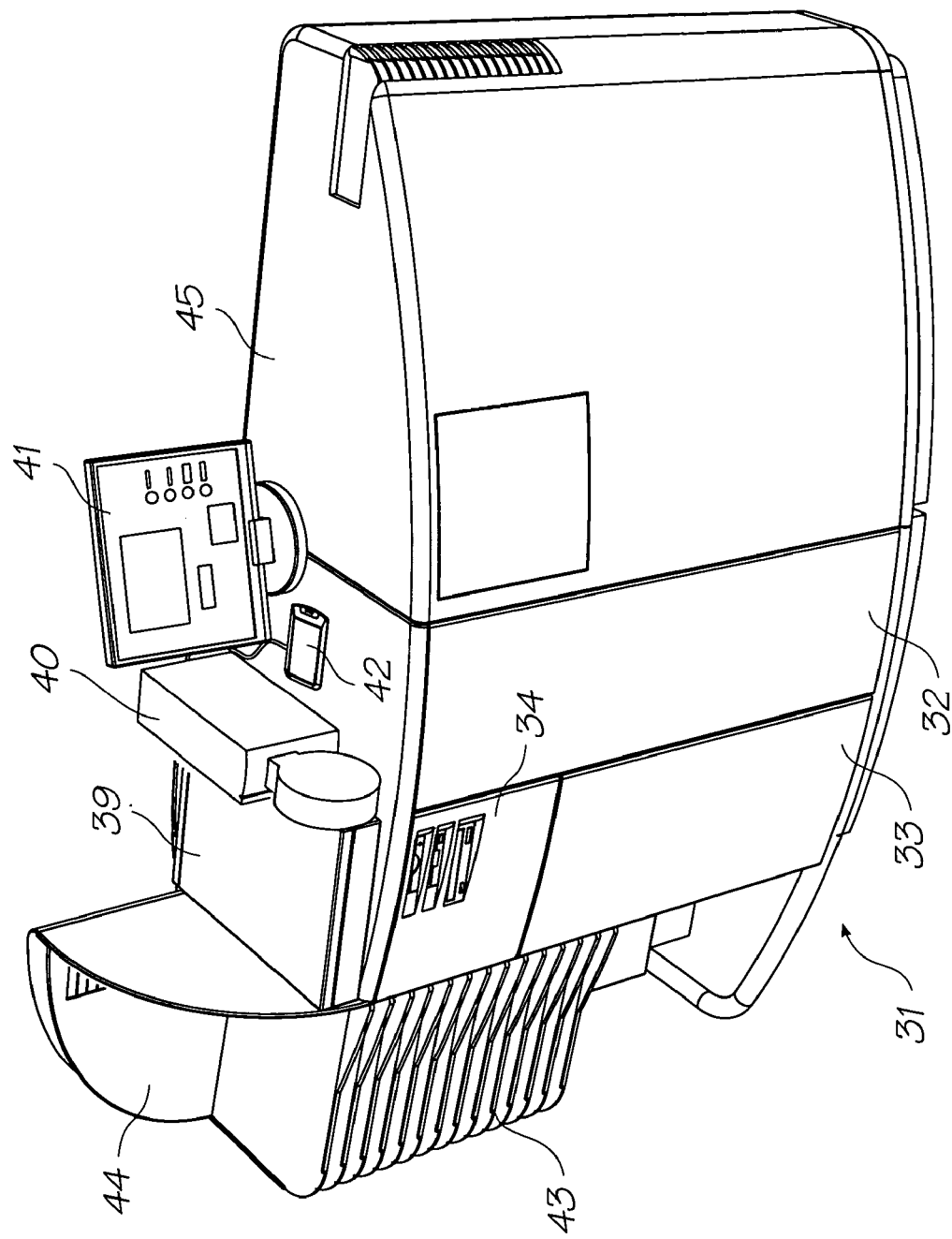
FIG. 3 shows cabinetry that is similar to that of FIG. 2 but which also incorporates a conventional film processing system.

A control and/or monitoring device 22 is connected to the computer for effecting control and/or monitoring functions and, although not specifically illustrated, such device might typically comprise one or more of:
 a) A keyboard.
 b) A touch screen, as illustrated in FIGS. 2 and 3.
 c) A mouse.
 d) A monitor.

Figure 1:
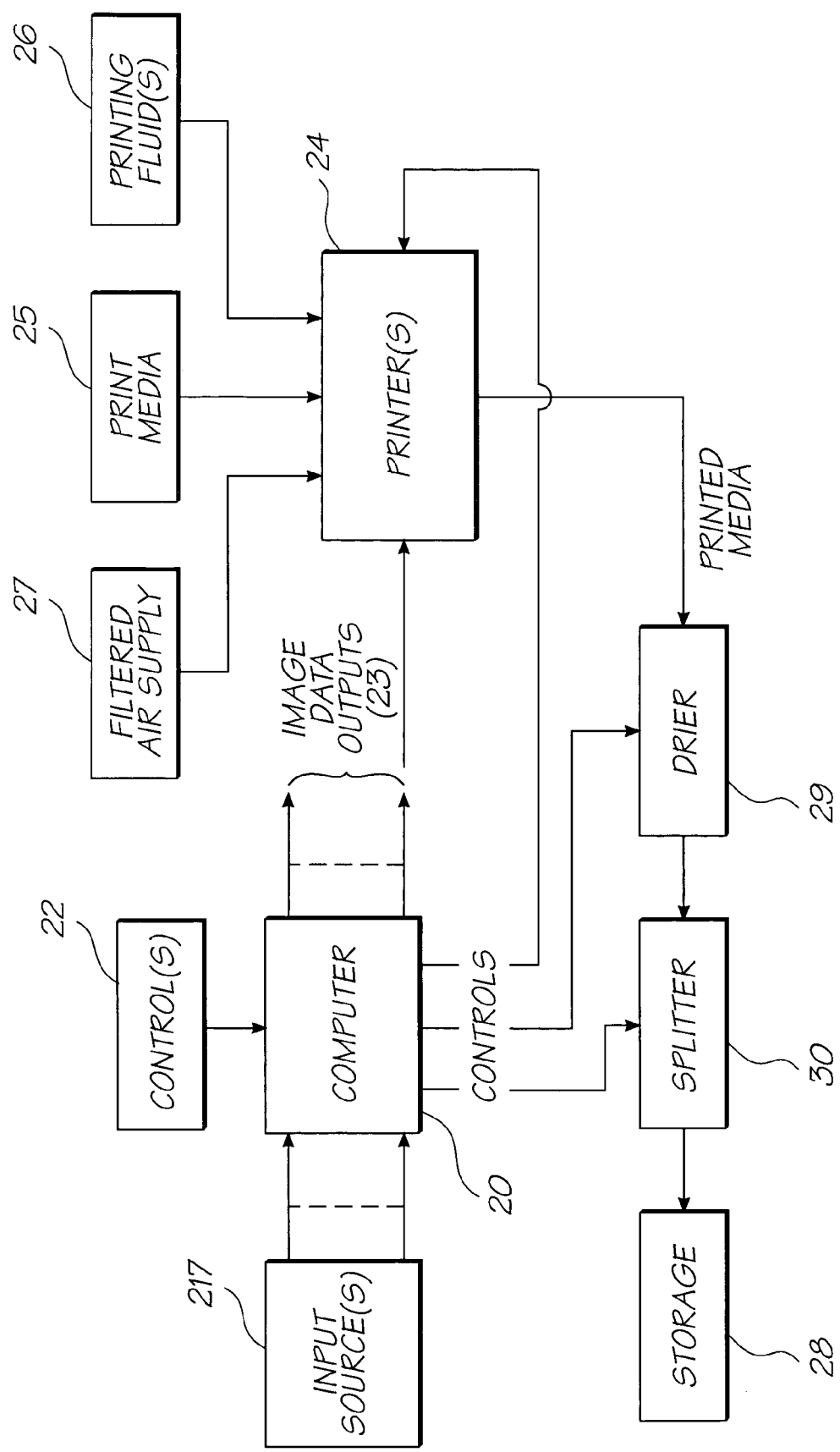
FIG. 1 shows a schematic representation of the digital photofinishing system.

Digital output signals 23 from the computer might be directed or routed to one or more of a variety of devices such as:
 a) A data storage device.
 b) A file storage device or system.
 c) An internet connection.
 d) One or more printers 24 as shown inter alia in FIG. 1.

A print media supply 25, a printing fluid supply 26 and an air supply 27 are coupled to the (or each) printer 24, and printed media from the printer(s) 24 is directed to a storage device 28 by way of a drier 29 and a slitting device 30.

The photofinishing system as illustrated in FIG. 1 may comprise and be termed a "digital minilab" for processing and printing photographic images that are fed to the computer 20, either directly or indirectly, as digitised images from input sources such as those referred to previously. In such case the print media supply 25 might comprise paper, card or plastic foil, all in either sheet or roll form, and the printing fluid supply might comprise one or more printing inks, depending upon whether the printer(s) is (or are) driven to produce colour prints, black-on-white prints or "invisible" infrared digital image encoded prints. Also, when processing and printing photographic images, the slitting device 30 may be driven to cut differently sized prints from a single width roll of print media. Thus, assuming a 12 inch (~30 mm) wide roll of print media, the media may, for example, be slit to produce photographic prints having sizes selected from:
 1-12×8 print
 1-12×4 print
 2-6×4 prints
 3-4×6 prints
 4-3×5 prints.

An important feature of the photofinishing system is that it employs what might be termed plain paper, page-width printing of photographic images. Thus, unlike conventional types of photographic minilabs that require:
 the development of film, the use of sensitised (coated) printing papers, specialised chemicals for use in developing, printing, stopping and fixing images, and skilled manipulation of developing/printing processes;
the photofinishing system as described herein effectively embodies a computer controlled printing system which, at least in some embodiments, provides for relatively simple, high speed yet flexible digital processing and subsequent page-width printing of photographic images.

Figure 4:
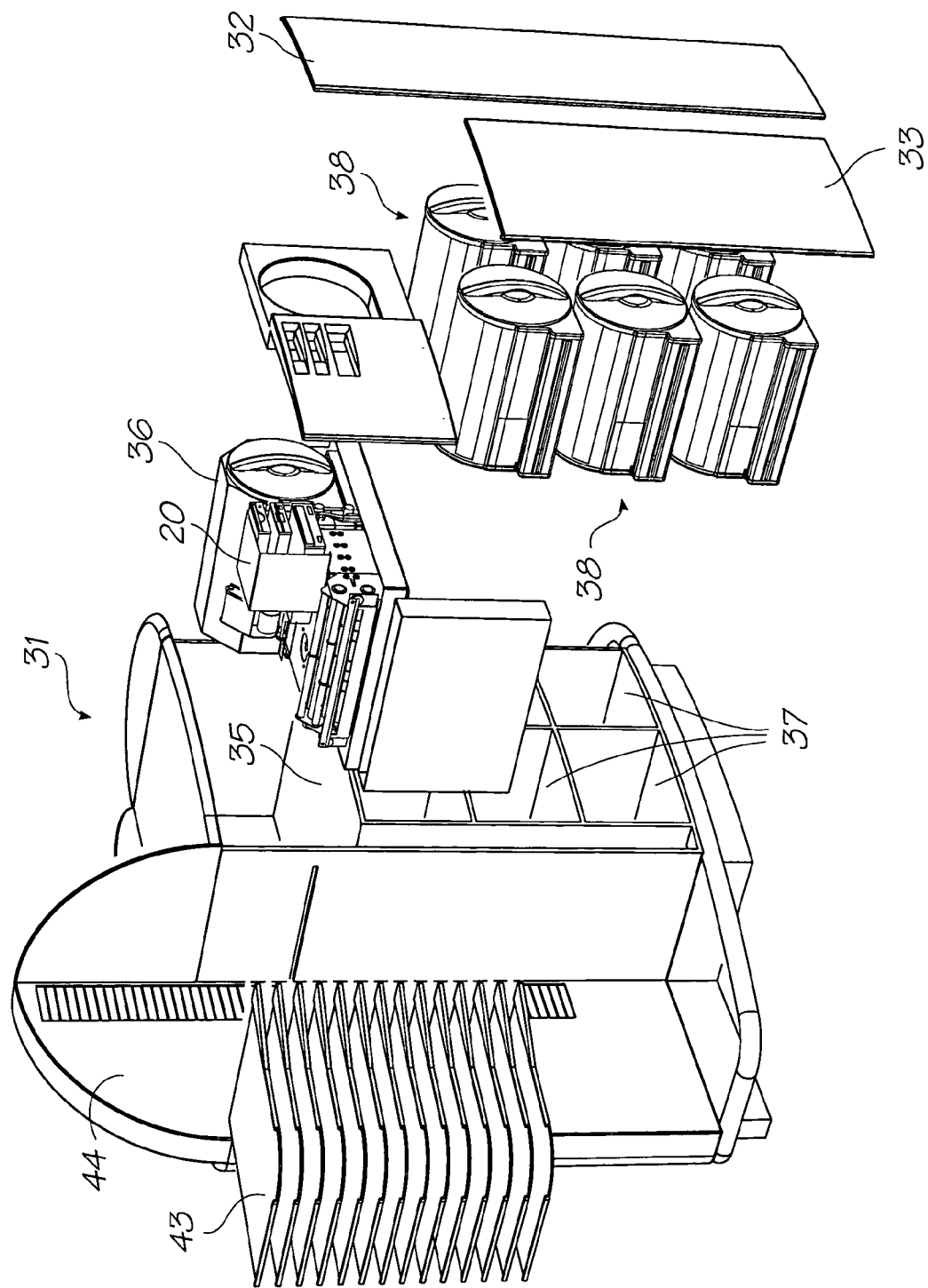
FIG. 4 shows an exploded perspective view of the cabinetry of FIG. 1 and components of the digital photofinishing system.
Figure 5:
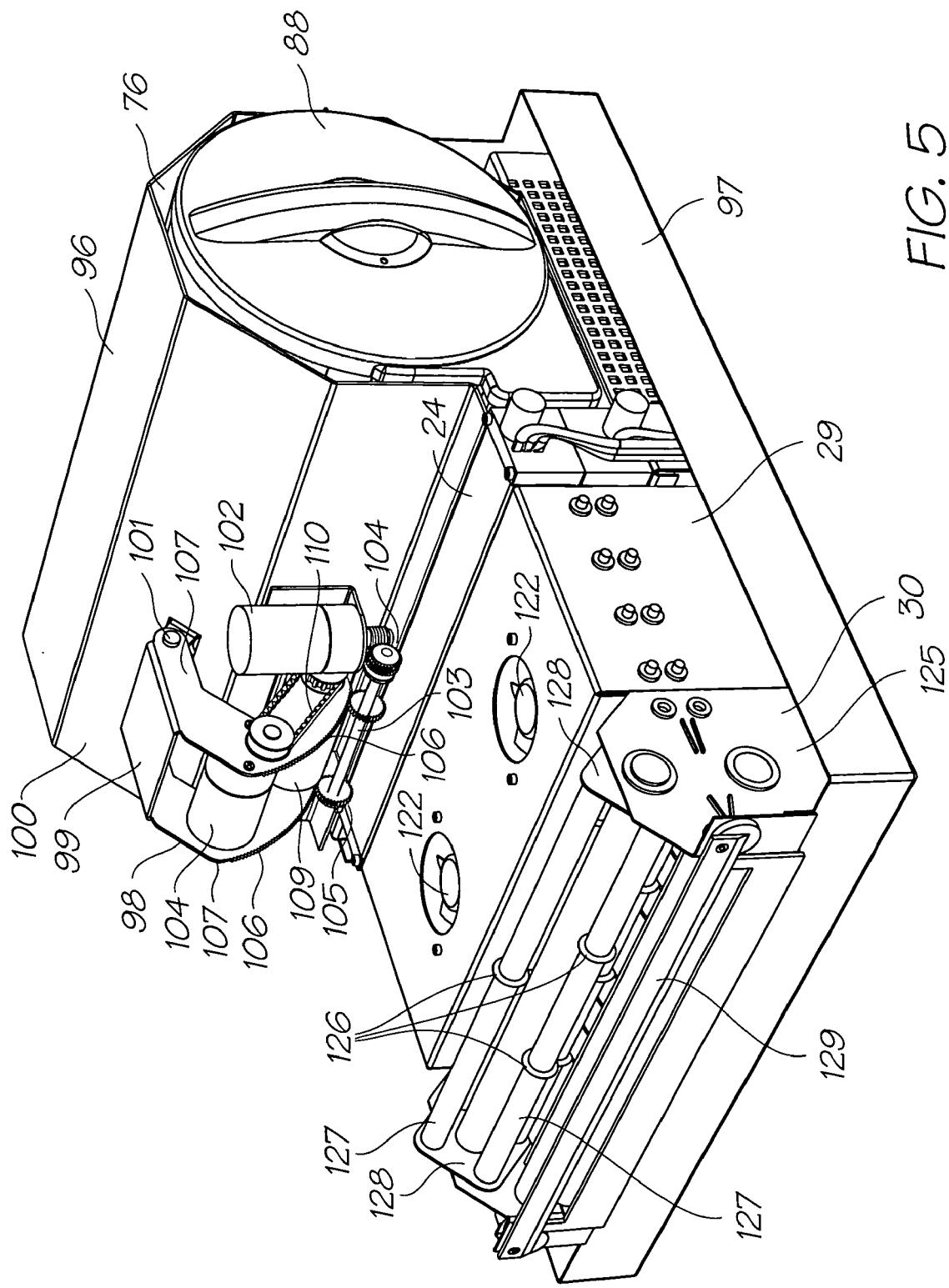
FIGS. 5 and 6 show right hand and left hand perspective views respectively of the components of the digital photofinishing system removed from the cabinetry of FIG. 1.
Figure 6:
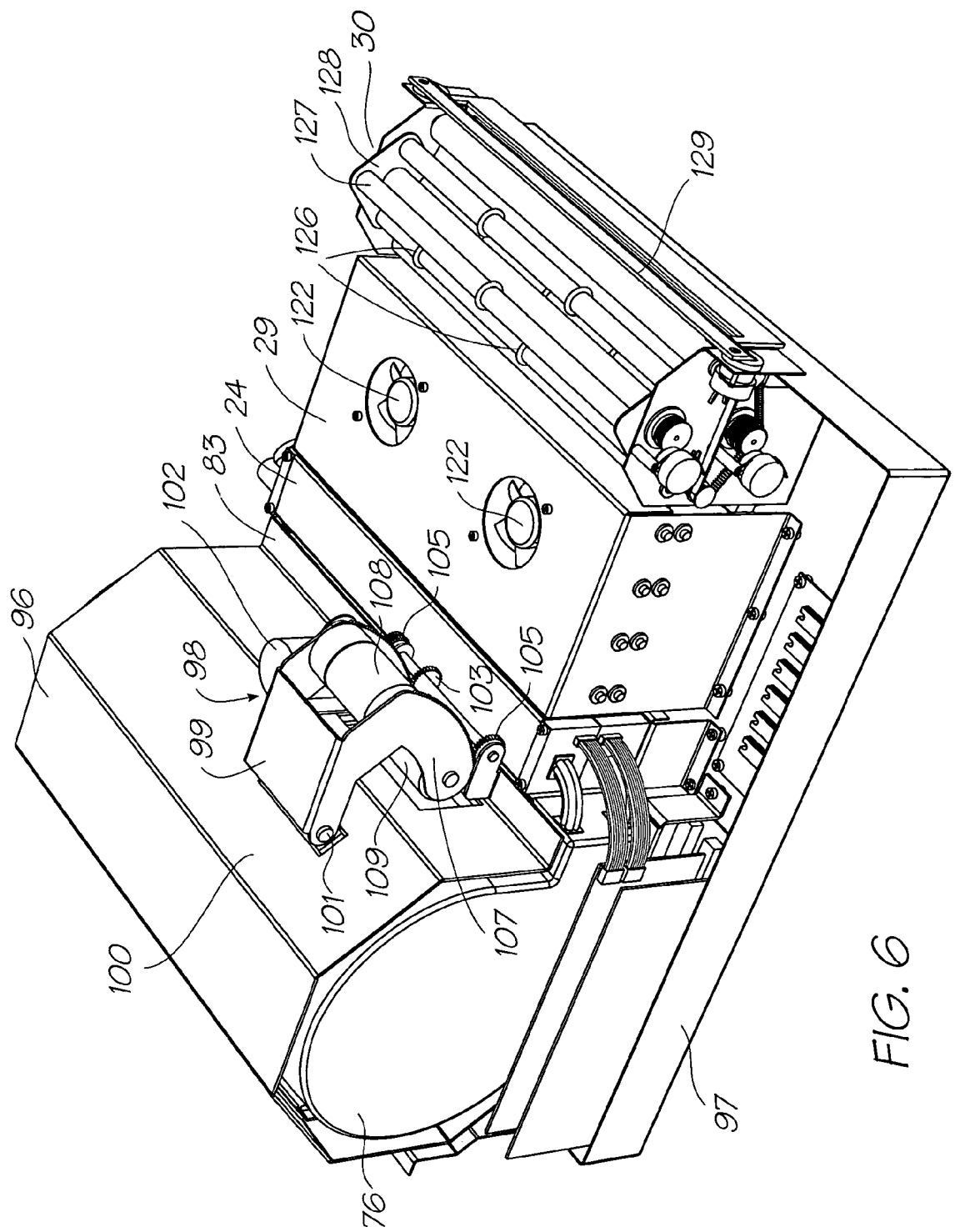

The photofinishing system may be integrated in the cabinetry shown in FIGS. 2 and 4 and, in that form, comprise a cabinet 31 having doors 32, 33 and 34. The cabinet is itself provided internally with an upper shelf 35 for receiving components 36 of the processing system, which are referred to later in greater detail, and with lower shelves 37 for receiving replacement and/or expended cartridge components 38 which also are referred to later in further detail. Mounted to an upper deck of the cabinet are input signal-generating devices in the form of a flatbed scanner 39, a high resolution 35 mm film and/or APS cartridge scanner 40, a touch screen control/monitoring device 41 incorporating a liquid crystal display, and a USB input and/or output device 42.

Print receiving trays 43 are located at one end of the cabinet and are coupled to a tray elevating device 44 of a conventional form.

The photofinishing system may alternatively be integrated in the cabinetry shown in FIG. 3 and, when in that form, further include a film processing unit 45. The film processing unit 45, although not illustrated in detail, comprises film processing apparatus of a conventional form which is known in the so-called minilab art for chemically developing and printing exposed photographic print and/or slide (transparency) film. Also, although again not shown, the film processing unit 45 includes compartments and/or reservoirs as known in the art for receiving chemicals that conventionally are used in developing, stopping and fixing development and printing of film and print paper.

The components 36 of the photofinishing system are now described in greater detail by reference to FIG. 1 and, selectively, to FIGS. 4 to 25 of the drawings.

Inputs to the computer 20 are provided as standardised image compression signals and are processed, typically as JPEG files, using processing procedures that are known in the art. File manipulation, again using procedures that are known in the art, may be provided for in two ways:
1) Automatically, for example, for effecting artefact adjustments such as red-eye removal, colour density adjustment and histogram equalisation, and
2) Manually, for example, for effecting such image modifications as colour-to-black-and-white translation, sepia finishing, image rotation and image cropping.

Figure 9:
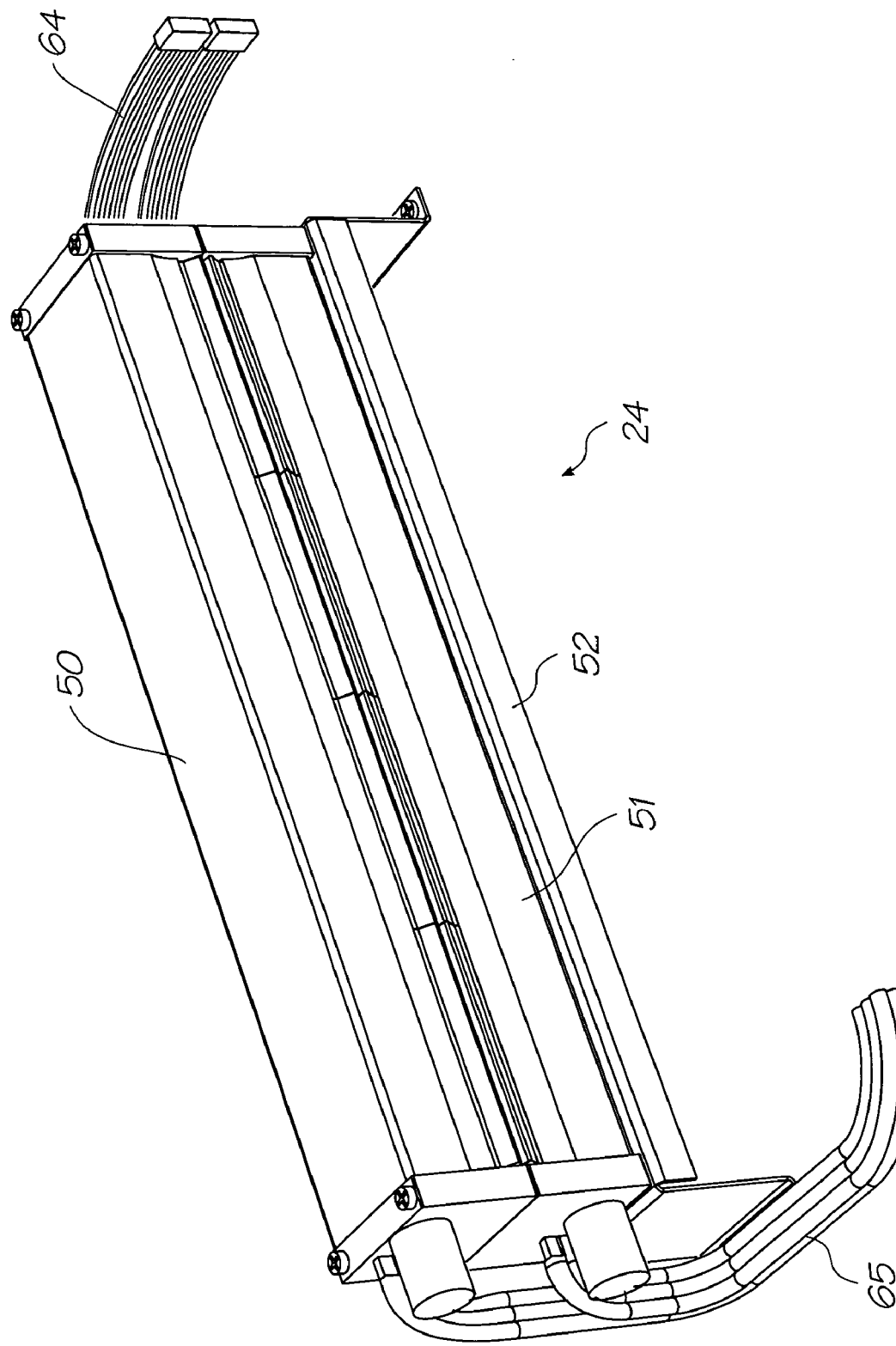
FIG. 9 shows a perspective view of two (upper and lower) confronting print head assemblies that constitute components of the digital photofinishing system.
Figure 10:
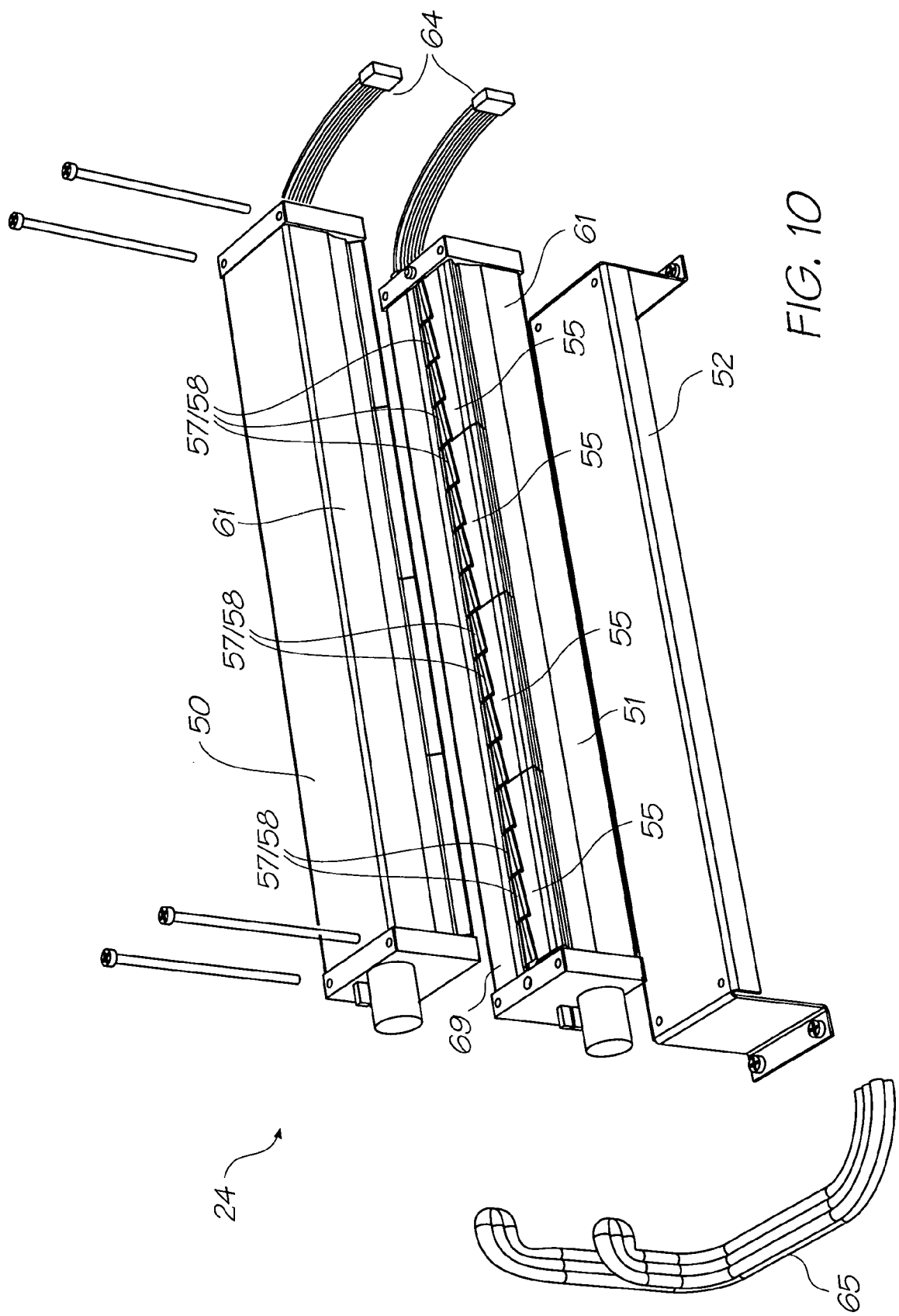
FIG. 10 shows an exploded perspective view of the print head assemblies of FIG. 9.

The illustrated output 23 (which in practice will be constituted by a plurality of output components) from the computer 20 is directed to the printer 24 which, when in the form illustrated in FIGS. 9 and 10 comprises two confronting print head assemblies 50 and 51. The print head assemblies are arranged selectively to direct printing ink onto one or the other or both of two faces of a single sheet of print media or, as in the case of the illustrated photofinishing system, onto one or the other or both of two faces of print media from a roll 75 of print media.

The print head assemblies 50 and 51 are mounted in space-apart relationship, that is they are separated by a distance sufficient to permit the passage of the print media between the assemblies during a printing activity, and the print head assemblies are mounted upon a support platform 52.

Each of the print head assemblies 50 and 51 may, for example, be in the form of that which is described in the Applicant's co-pending U.S. patent applications Ser. Nos. 10/760,272, 10/760,273, 10/760,187, 10/760,187, 10/760,188, 10/760,218, 10/760,217, 10/760,218, 10/760,233, 10/760,246, 10/760,212, 10/760,243, 10/760,201, 10/760,185, 10/760,253, 10/760,255, 10/760,209, 10/760,208, 10/760,194, 10/760,238, 10/760,234, 10/760,235, 10/760,183, 10/760,189, 10/760,262, 10/760,232, 10/760,231, 10/760,200, 10/760,190, 10/760,191, 10/760,227, 10/760,207, 10/760,187, which is incorporated herein by reference, but other types of print head assemblies (including thermal or piezo-electric activated bubble jet printers) that are known in the art may alternatively be employed.

In general terms, and as illustrated in FIGS. 9 to 14 for exemplification purposes, each of the print head assemblies 50 and 51 comprises four print head modules 55, each of which in turn comprises a unitary arrangement of:
a) a plastics material support member 56,
b) four print head micro-electro-mechanical system (MEMS) integrated circuit chips 57 (referred to herein simply as "print head chips"),
c) a fluid distribution arrangement 58 mounting each of the print head chips 57 to the support member 56, and
d) a flexible printed circuit connector 59 for connecting electrical power and signals to each of the print head chips 57.

Each of the chips (as described in more detail later) has up to 7680 nozzles formed therein for delivering printing fluid onto the surface of the print media and, possibly, a further 640 nozzles for delivering pressurised air or other gas toward the print media.

The four print head modules 55 are removably located in a channel portion 60 of a casing 61 by way of the support member 56 and the casing contains electrical circuitry 62 mounted on four printed circuit boards 63 (one for each print head module 55) for controlling delivery of computer regulated power and drive signals by way of flexible PCB connectors 63a to the print head chips 57. As illustrated in FIGS. 9 and 10, electrical power and print activating signals are delivered to one end of the two print head assemblies 50 and 51 by way of conductors 64, and printing ink and air are delivered to the other end of the two print head assemblies by fluid delivery lines 65.

The printed circuit boards 63 are carried by plastics material mouldings 66 which are located within the casing 61 and the mouldings also carry busbars 67 which in turn carry current for powering the print head chips 57 and the electrical circuitry. A cover 68 normally closes the casing 61 and, when closed, the cover acts against a loading element 69 that functions to urge the flexible printed circuit connector 59 against the busbars 67.

The four print head modules 55 may incorporate four conjoined support members 56 or, alternatively, a single support member 56 may be provided to extend along the full length of each print head assembly 50 and 51 and be shared by all four print head modules. That is, a single support member 56 may carry all sixteen print head chips 57.

Figure 11:
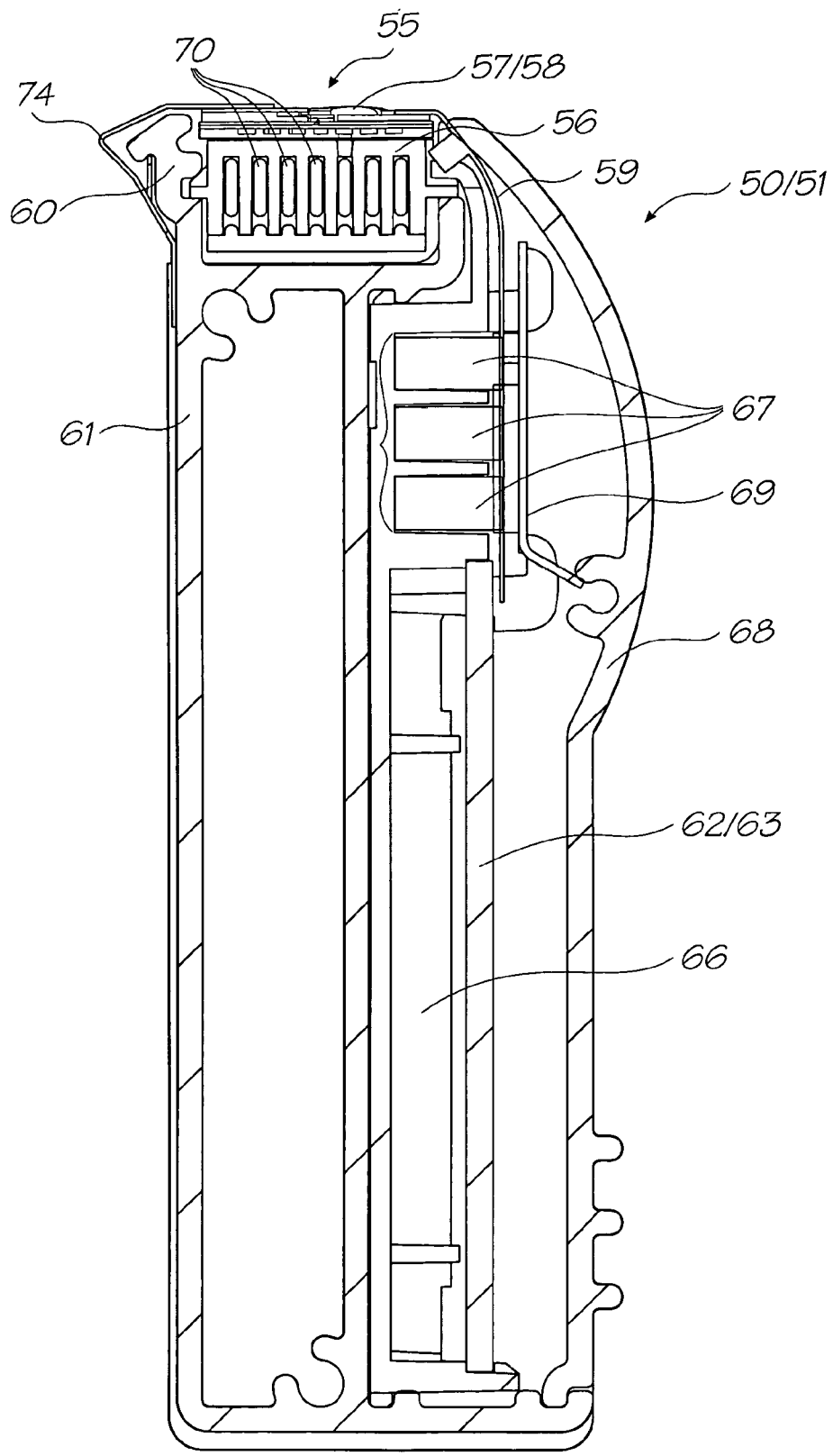
FIG. 11 shows a sectional end view of one print head assembly of a type that is slightly different in construction from that shown in FIGS. 9 and 10.
Figure 12:
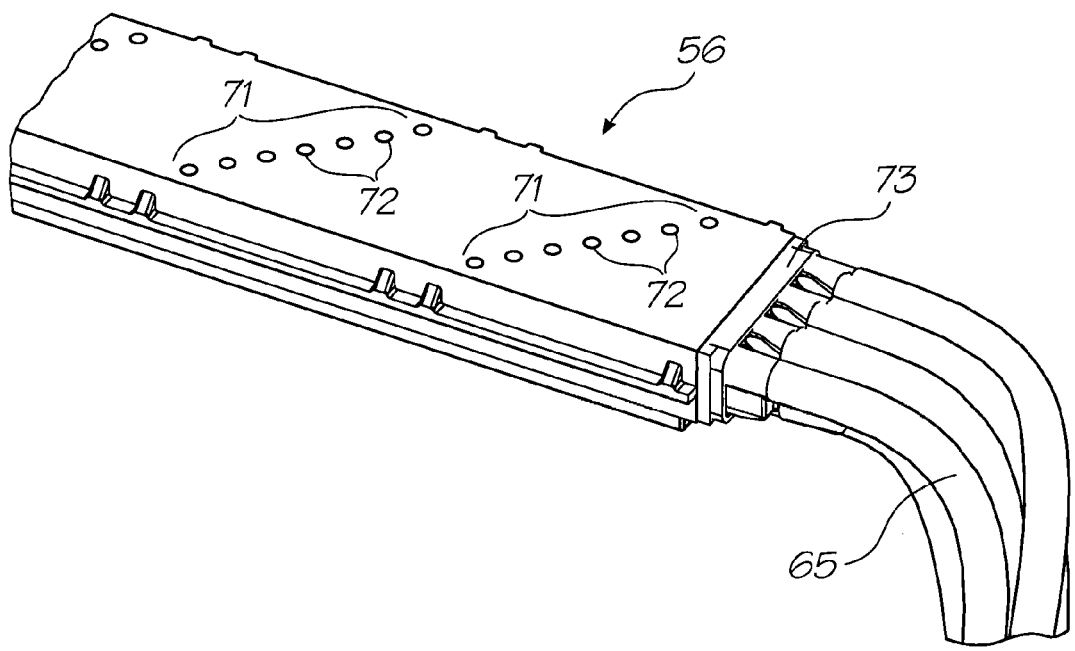
FIG. 12 shows a perspective view of an end portion of a channelled support member removed from the print head assembly of FIG. 11 and fluid delivery lines connected to the support member.
Figure 13:
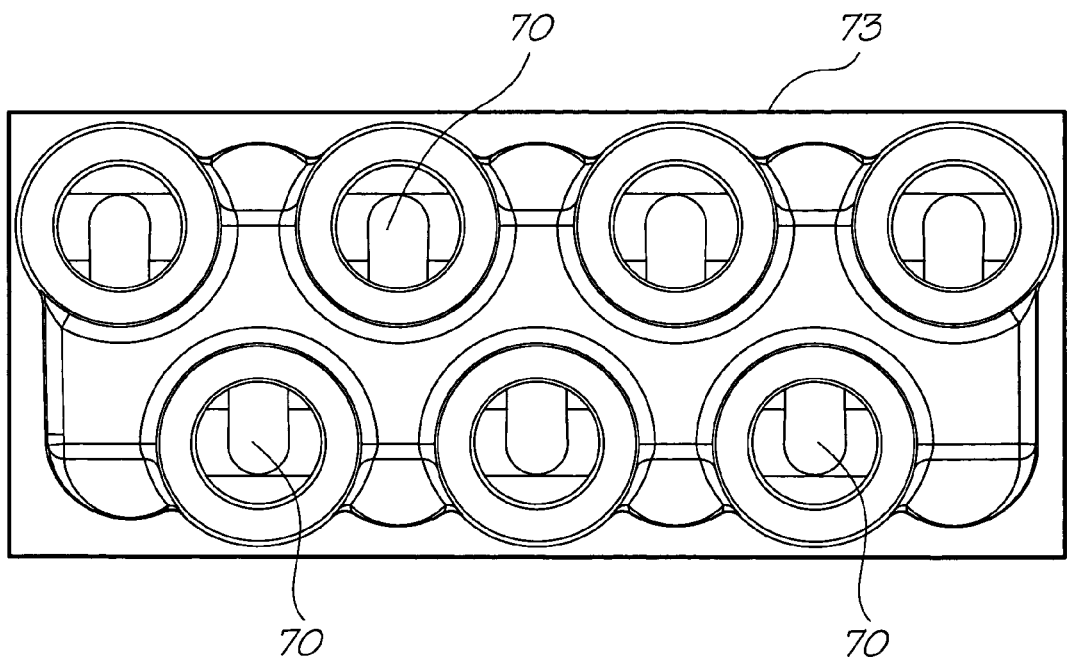
FIG. 13 shows an end view of connections made between the fluid delivery lines and the channelled support member of FIG. 12.
Figure 14:
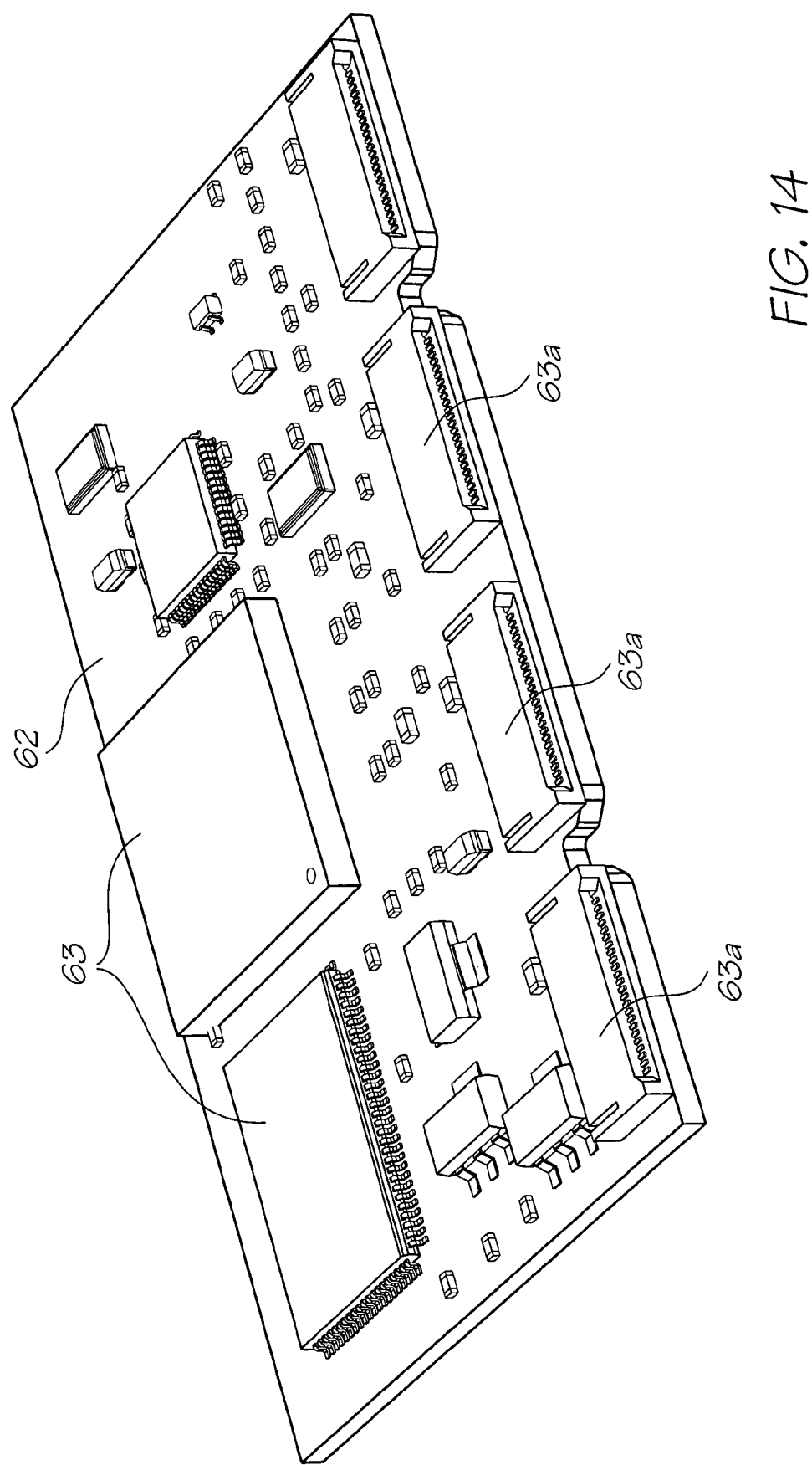
FIG. 14 shows a printed circuit board, with electronic components mounted to the board, when removed from a casing portion of the print head assembly of FIG. 11, FIGS. 15 and 16 show right hand and left hand views respectively of a cartridge that constitutes a removable/replaceable component of the digital photofinishing system.
Figure 15:
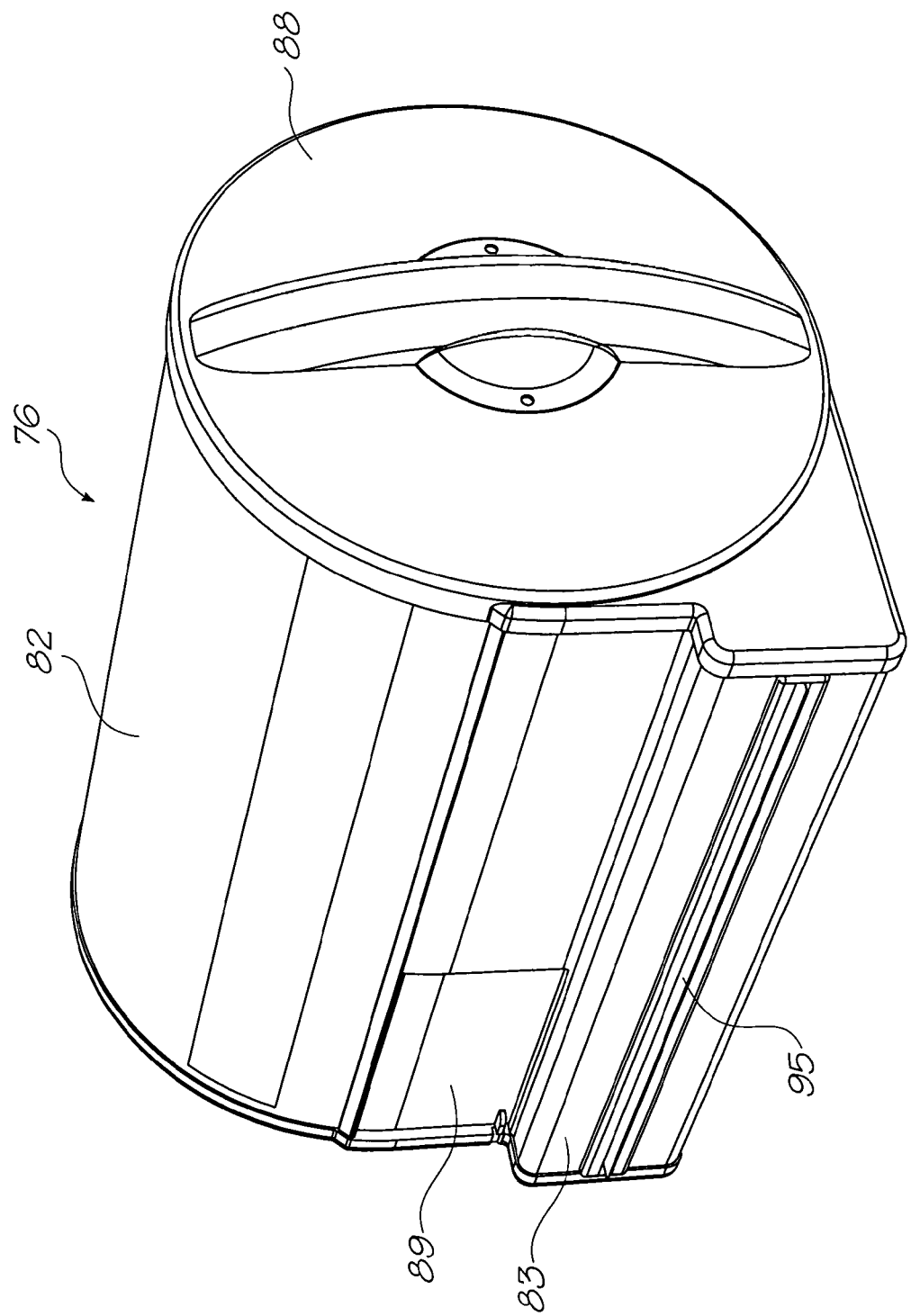
Figure 16:
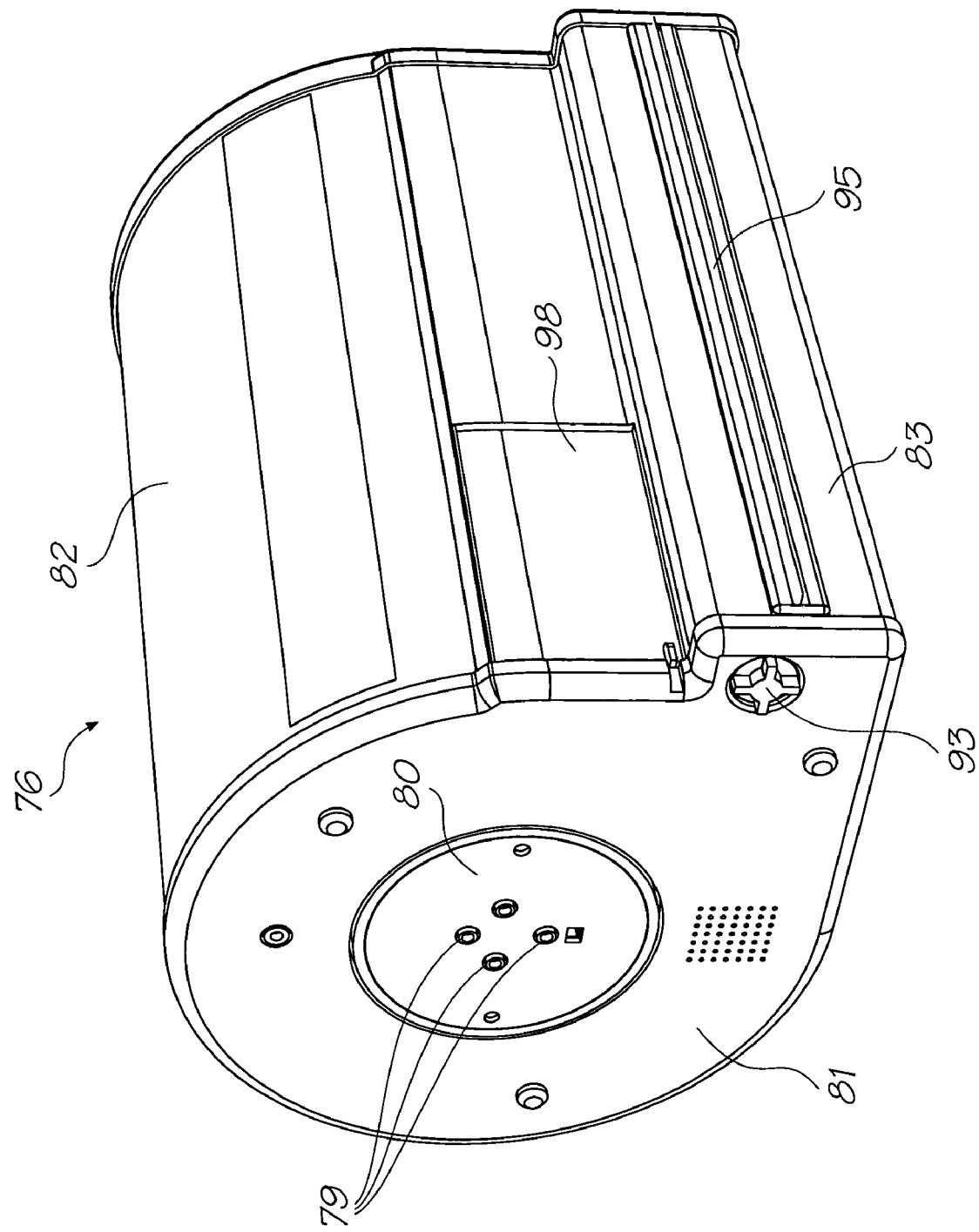

As shown in FIGS. 11 and 12, the support member 56 comprises an extrusion that is formed with seven longitudinally extending closed channels 70, and the support member is provided in its upper surface with groups 71 of millimetric sized holes. Each group comprises seven separate holes 72 which extend into respective ones of the channels 70 and each group of holes is associated with one of the print head chips 57. Also, the holes 72 of each group are positioned obliquely across the support member 56 in the longitudinal direction of the support member.

A coupling device 73 is provided for coupling fluid into the seven channels 70 from respective ones of the fluid delivery lines 65.

The fluid distribution arrangements 58 are provided for channelling fluid (printing ink and air) from each group 71 of holes to an associated one of the print head chips 57. Printing fluids from six of the seven channel 70 are delivered to twelve rows of nozzles on each print head chip 57 (ie, one fluid to two rows) and the millimetric-to-micrometric distribution of the fluids is effected by way of the fluid distribution arrangements 58. For a more detailed description of one arrangement for achieving this process reference may be made to the co-pending U.S. patent application referred to previously.

An illustrative embodiment of one print head chip 57 is described in more detail, with reference to FIGS. 18 to 27, toward the end of this drawing-related description; as is an illustrative embodiment of a print engine controller for the print head assemblies 50 and 51. The print engine controller is later described with reference to FIGS. 28 to 30.

A print media guide 74 is mounted to each of the print head assemblies 50 and 51 and is shaped and arranged to guide the print media past the printing surface, as defined collectively by the print head chips 57, in a manner to preclude the print media from contacting the nozzles of the print head chips.

As indicated previously, the fluids to be delivered to the print head assemblies 50 and 51 will be determined by the functionality of the processing system. However, as illustrated, provision is made for delivering six printing fluids and air to the print head chips 57 by way of the seven channels 70 in the support member 56. The six printing fluids may comprise:

Cyan printing ink
Magenta printing ink
Yellow printing ink
Black printing ink
Infrared ink
Fixative.

The filtered air will in use be delivered at a pressure slightly above atmospheric from a pressurised source (not shown) that is integrated in the processing system.

Figure 8:
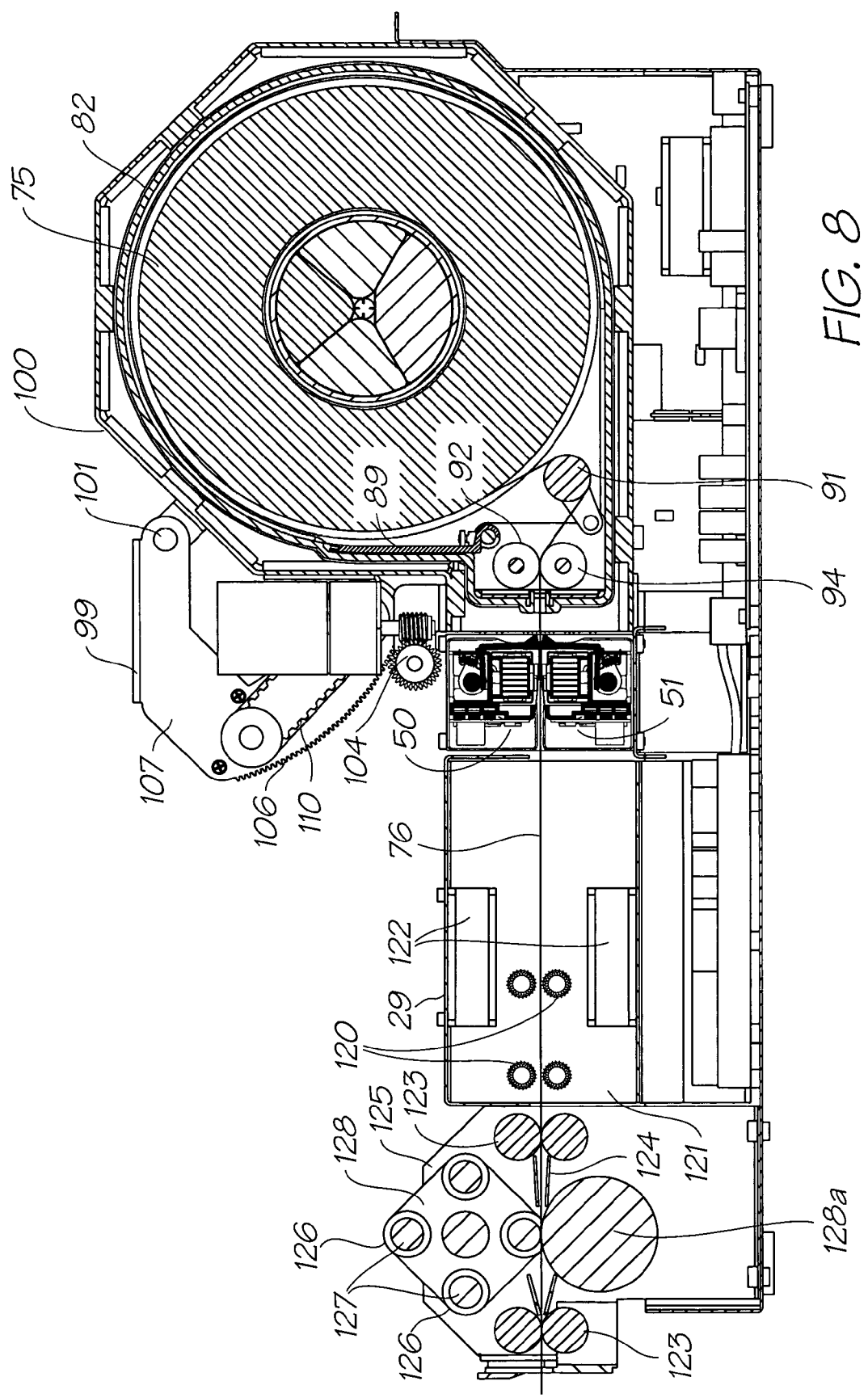
FIG. 8 shows a sectional elevation view of the components of FIGS. 5 and 6.
Figure 17:
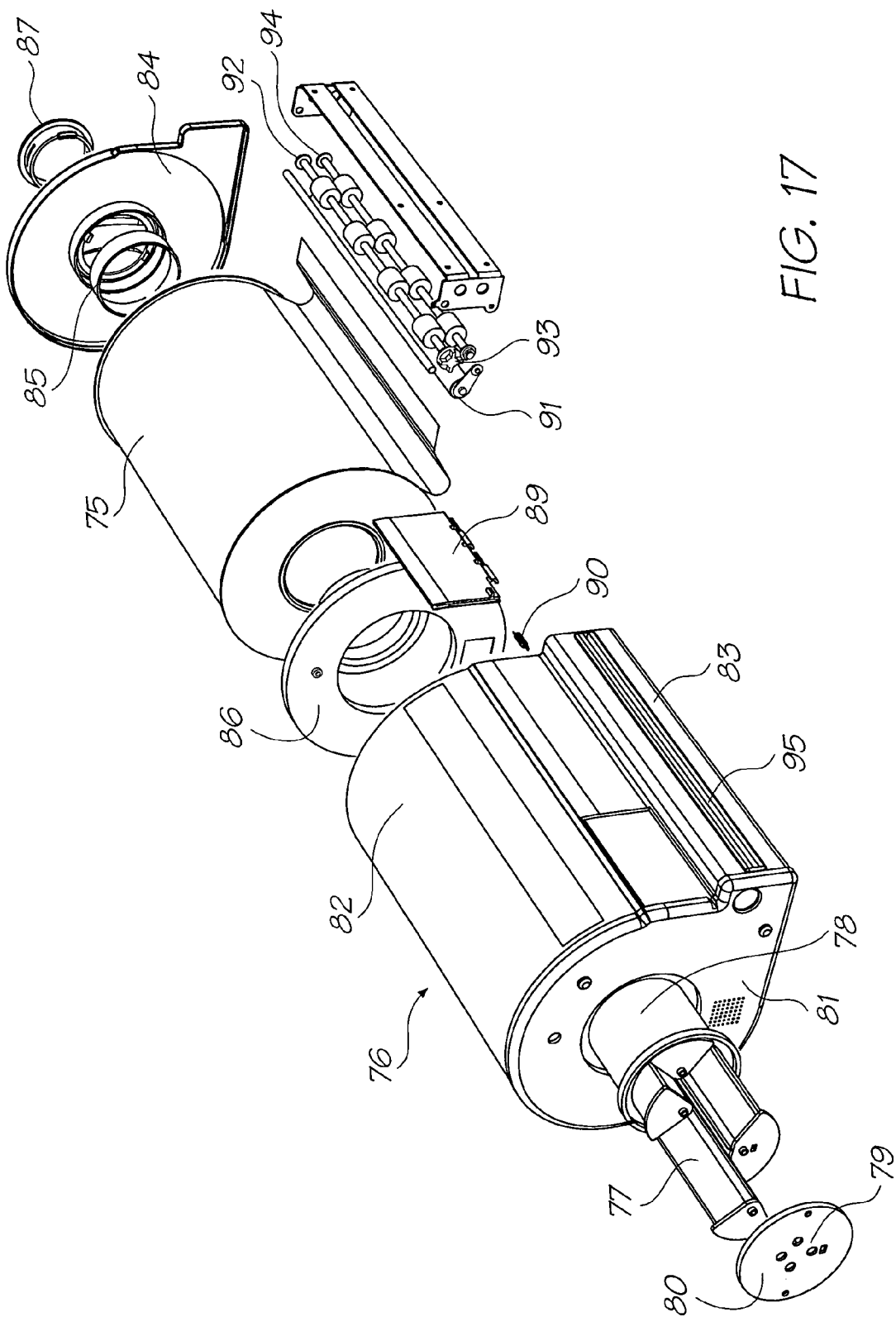
FIG. 17 shows an exploded perspective view of the cartridge as shown in FIGS. 15 and 16.
Figure 18:
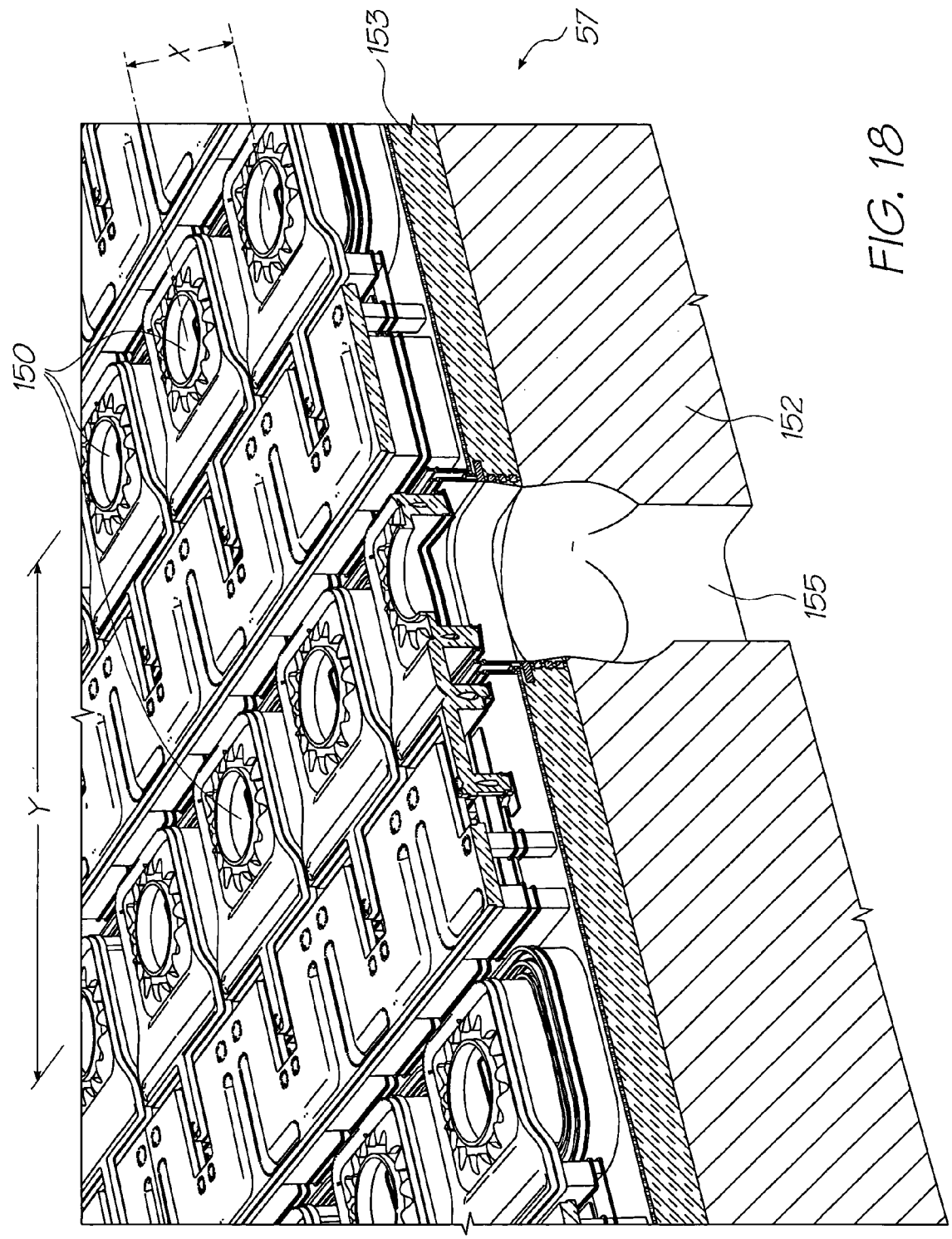
FIG. 18 shows, in perspective, a sectional view of a portion a print head chip that incorporates printing fluid delivery nozzles and, in the form of an integrated circuit, nozzle actuators.

The print media may, as indicated previously, be provided in various forms. However, as shown in FIGS. 8 and 17 the print media is conveniently provided in the form of a paper roll 75 from which paper is, on demand, unrolled and transported through the printing, drying and slitting stages under the control of the computer 20.

As illustrated, the paper roll 75 is housed in and provided by way of a replaceable/rechargeable, primary cartridge 76, and the printing fluids are provided in refillable, secondary cartridges 77 which are removably located within a tubular core 78 of the primary cartridge 76. Four only of the secondary cartridges 77 are shown in FIG. 17 of the drawings, for containing the four printing inks referred to above, but it will be understood that further secondary cartridges may be provided in the same way for infrared ink and for fixative if required.

Fluid outlet ports 79 are provided in an end cap 80 that is located in an end wall 81 of the primary cartridge 76 to facilitate connection of the fluid delivery lines 65 to respective ones of the secondary cartridges 77.

The primary cartridge 76 comprises a generally cylindrical housing portion 82, that is shaped and dimensioned to surround a full roll of the paper 75, and a generally oblong paper delivery portion 83 that extends forwardly from a lower region of the housing portion 82. Both the housing portion 82 and the paper delivery portion 83 extend between end walls 81 and 84 of the primary cartridge 76, and the end walls are provided with bearings 85 which carry the tubular core 78. Low friction roll support bearings 86 are carried by the tubular core 78 for supporting the paper roll 75, and an end cap 87 having a bayonet fitting is provided for capping the end of the tubular core that is remote from the end cap 80.

The housing portion 82 of the primary cartridge 76 and the end walls 81 and 84 are, as illustrated, configured and interconnected in a manner to facilitate convenient removal and replacement of a spent roll 75 and empty secondary cartridges 77. To this end, a latching closure 88 is removably fitted to the end of the cartridge through which replacement paper rolls 75 are loaded.

A sliding door 89 is provided in a vertical wall portion of the housing portion 82 immediately above the paper delivery portion 83. The door 89 is normally biased toward a closed position by a spring 90 and the door is opened only when the cartridge is located in an operating position (to be further described) and drive is to be imparted to the paper roll 75.

Located within and extending along the length of the paper delivery portion 83 of the primary cartridge 76 are a gravity loaded or, if required, a spring loaded tensioning roller 91, a drive roller 92 which is fitted with a coupling 93 and a pinch roller 94. A slotted gate 95 is located in the forward face of the paper delivery portion 83 through which paper from the roll 75 is in use directed by the drive and pinch rollers.

The complete primary cartridge 76 is fitted as a replaceable unit into a compartment 96 of a mounting platform 97 that supports, inter alia, the print head assemblies 50 and 51, the drier 29 and the slitting device 30. The cartridge housing portion 82 and the compartment 96 are sized and arranged to provide a neat sliding fit for the cartridge and to preclude significant relative movement of the components.

A paper feed drive mechanism 98 is mounted to the compartment 96 and comprises a pivotable carrier 99 that is pivotally mounted to an upper wall portion 100 of the compartment 96 by way of a pivot axis 101. A first drive motor 102 is also mounted to the compartment 96 and is coupled to the carrier 99 by way of a drive shaft 103. Drive is imparted to the shaft 103 by way of a worm wheel and pinion drive arrangement 104, and pivotal drive is imparted to the pivot able carrier 99 by shaft pinions 105 that mesh with racks 106 that are formed integrally with side members 107 of the pivot able carrier.

A second drive motor 108 is mounted to the pivot able carrier 99 and is provided for imparting drive to a primary drive roller 109 by way of a drive belt 110.

In operation of the photofinishing system, when the sliding door 89 is opened, the first drive motor 102 is energised to pivot the carrier 99 such that the primary drive roller 109 is moved into driving engagement with the paper roll 75, and the second drive motor 108 is then energised to cause rotary drive to be imparted to the paper roll 75.

A third drive motor 111, which couples with the drive roller 92 by way of the coupling 93, is also energised in synchronism with the first and second drive motors for directing the paper 75 from the cartridge 76 as it is unwound from the roll 75. Feedback sensors (not shown) are provided as components of electric control circuitry 112 for the motors 102, 108 and 111.

Figure 7:
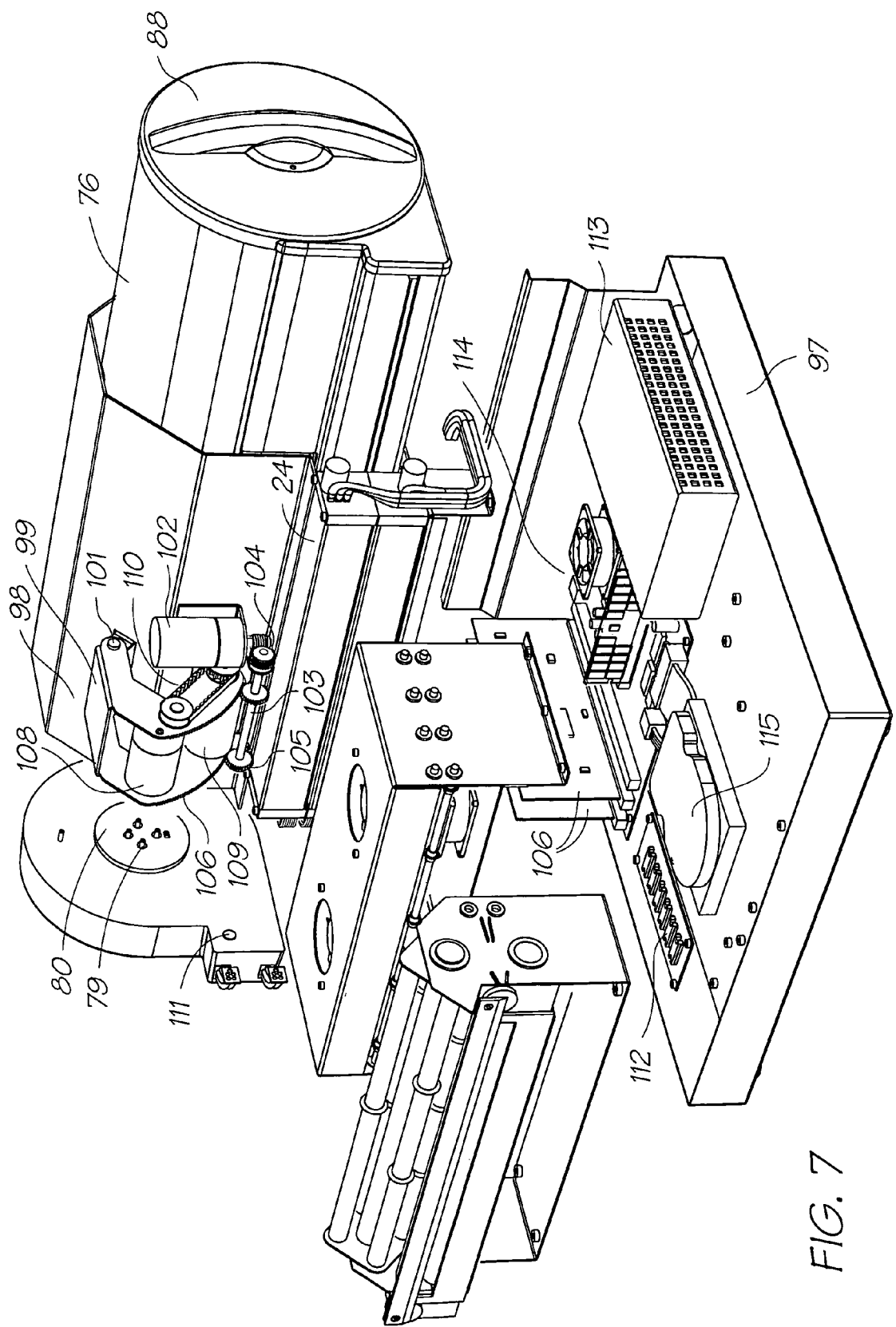
FIG. 7 shows an exploded perspective view of the components of FIGS. 5 and 6 together with ancillary components.

The motor control circuitry 112 is mounted to the mounting platform 97 adjacent components of the computer 20. As illustrated in FIG. 7, those components include a power supply 113, a CPU 114, a hard disk drive 115 and PCI boards 116.

The print head assemblies 50 and 51 (as previously described) are mounted to the mounting platform 97 immediately ahead of the slotted gate 97 of the cartridge 76 (in the direction of paper feed) and are selectively driven to deliver printing fluid to one or the other or both faces of the paper as it passes between the print head assemblies. Then, having passed between the print head assemblies the paper is guided into and through the drier 29.

The drier 29 comprises a series of guide rollers 120 that extend between side walls of a housing 121, and upper and lower blowers 122 are provided for directing drying air onto one or the other or both faces of the paper as it passes through the drier.

The slitting device 30 comprises guide rollers 123 and guide vanes 124 that extend between side walls 125 of the slitting device for transporting the paper through the slitting device following its passage through the drier 29. Also, spaced-apart slitting blades 126 are mounted to shafts 127 which are, in turn, mounted to a rotatable turret 128, and the turret is selectively positional, relative to a supporting roller 128a, to effect one or another of a number of possible slitting operations as previously described.

A guillotine 129 is also mounted to the slitting device 30 and is selectively actuable in conjunction with the slitting device to cut the paper 75 at selected intervals.

In operation of the above described and illustrated processing system, an input signal that is representative of a digitised photograph or photograph-type image is input to the computer 20 and processed and, if required, manipulated for the purpose of generating an output signal. The output signal is representative of a photographic image to be printed by the printer 24 and is employed to drive the printer 24 by way of the print head control circuitry 62 in the print head assemblies 50 and 51. As indicated previously, the print head assemblies are driven to provide on demand page-width printing and relevant (typical) printing characteristics are identified as follows:

Pagewidth dimension—150 mm to 1250 mm
Print head width—160 mm to 1280 mm
Number of print head chips per print head—8 to 64
Number of nozzles per print head chip—7680
Number of nozzles per colour per print head chip—1280
Nozzle activation (repetition) rate—20 to 50 kHz
Drop size per nozzle—1.5 to 5.0 picolitre
Paper feed rate—Up to 2.0 m per sec One of the print head chips 57 is now described in more detail with reference to FIGS. 18 to 27.

As indicated above, each print head chip 57 is provided with 7680 printing fluid delivery nozzles 150. The nozzles are arrayed in twelve rows 151, each having 640 nozzles, with an inter-nozzle spacing X of 32 microns, and adjacent rows are staggered by a distance equal to one-half of the inter-nozzle spacing so that a nozzle in one row is positioned mid-way between two nozzles in adjacent rows. Also, there is an inter-nozzle spacing Y of 80 microns between adjacent rows of nozzles.

Two adjacent rows of the nozzles 150 are fed from a common supply of printing fluid. This, with the staggered arrangement, allows for closer spacing of ink dots during printing than would be possible with a single row of nozzles and also allows for a level of redundancy that accommodates nozzle failure.

The print head chips 57 are manufactured using an integrated circuit fabrication technique and, as previously indicated, embody a micro-electromechanical system (MEMS).

Each print head chip 57 includes a silicon wafer substrate 152 and a 0.42 micron 1 P4M 12 volt CMOS microprocessing circuit is formed on the wafer. Thus, a silicon dioxide layer 153 is deposited on the substrate 152 as a dielectric layer and aluminium electrode contact layers 154 are deposited on the silicon dioxide layer 153. Both the substrate 152 and the layer 153 are etched to define an ink channel 155, and an aluminium diffusion barrier 156 is positioned about the ink channel 155.

A passivation layer 157 of silicon nitride is deposited over the aluminium contact layers 154 and the layer 153. Portions of the passivation layer 157 that are positioned over the contact layers 154 have openings 158 therein to provide access to the contact layers.

Each nozzle 150 includes a nozzle chamber 159 which is defined by a nozzle wall 160, a nozzle roof 161 and a radially inner nozzle rim 162. The ink channel 155 is in fluid communication with the chamber 159.

Figure 19:
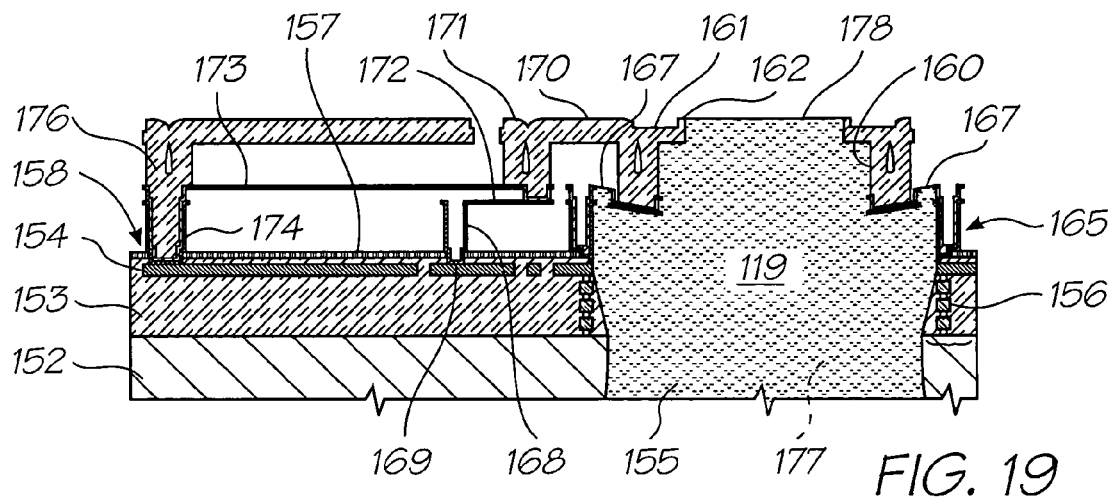
FIG. 19 shows a vertical section of a single nozzle in a quiescent state.

A moveable rim 163, that includes a movable seal lip 164, is located at the lower end of the nozzle wall 160. An encircling wall 165 surrounds the nozzle and provides a stationery seal lip 166 that, when the nozzle 150 is at rest as shown in FIG. 19, is adjacent the moveable rim 163. A fluidic seal 167 is formed due to the surface tension of ink trapped between the stationery seal 166 and the moveable seal lip 164. This prevents leakage of ink from the chamber whilst providing a low resistance coupling between the encircling wall 165 and a nozzle wall 160.

Figure 22:
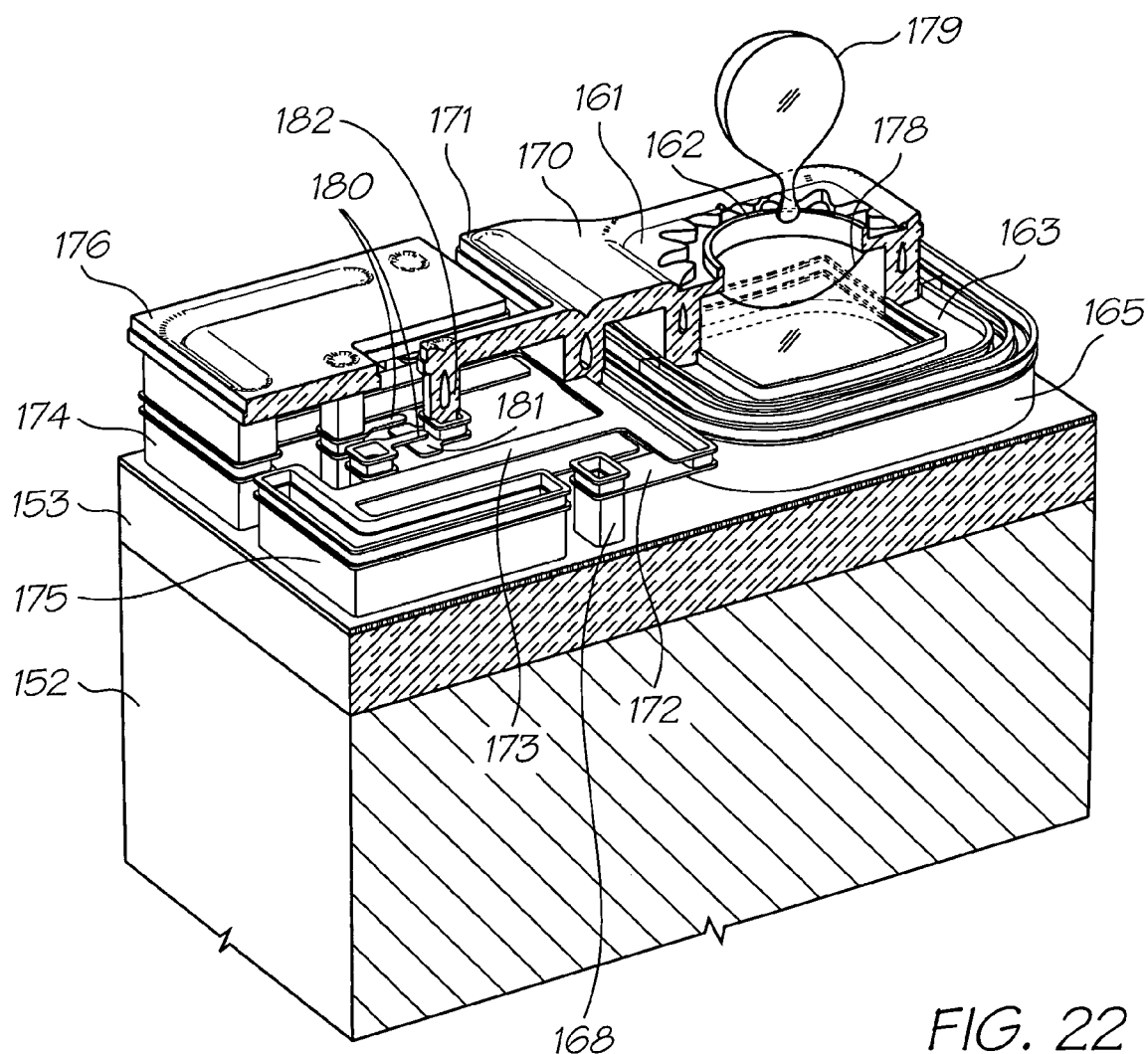
FIG. 22 shows a perspective view of a single nozzle in the activation state shown in FIG. 21.
Figure 23:
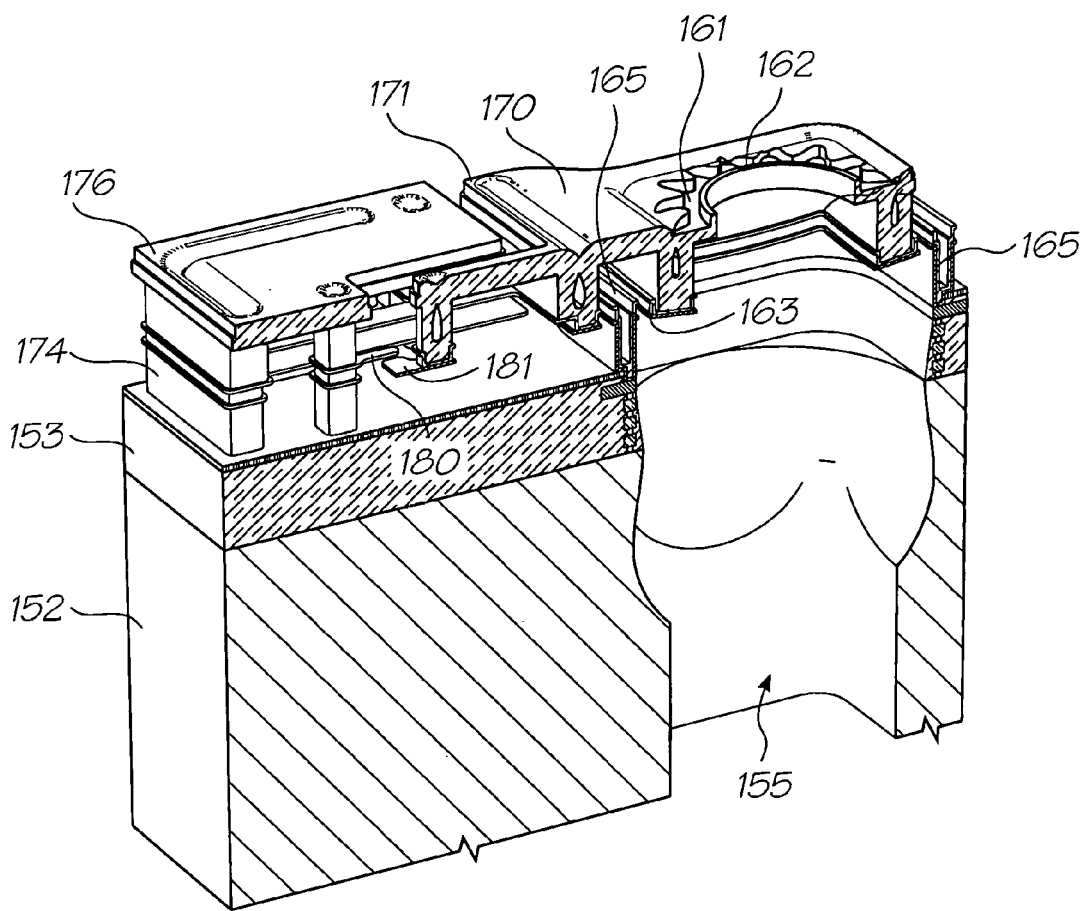
FIG. 23 shows in perspective a sectioned view of the nozzle of FIG. 22.
Figure 24:
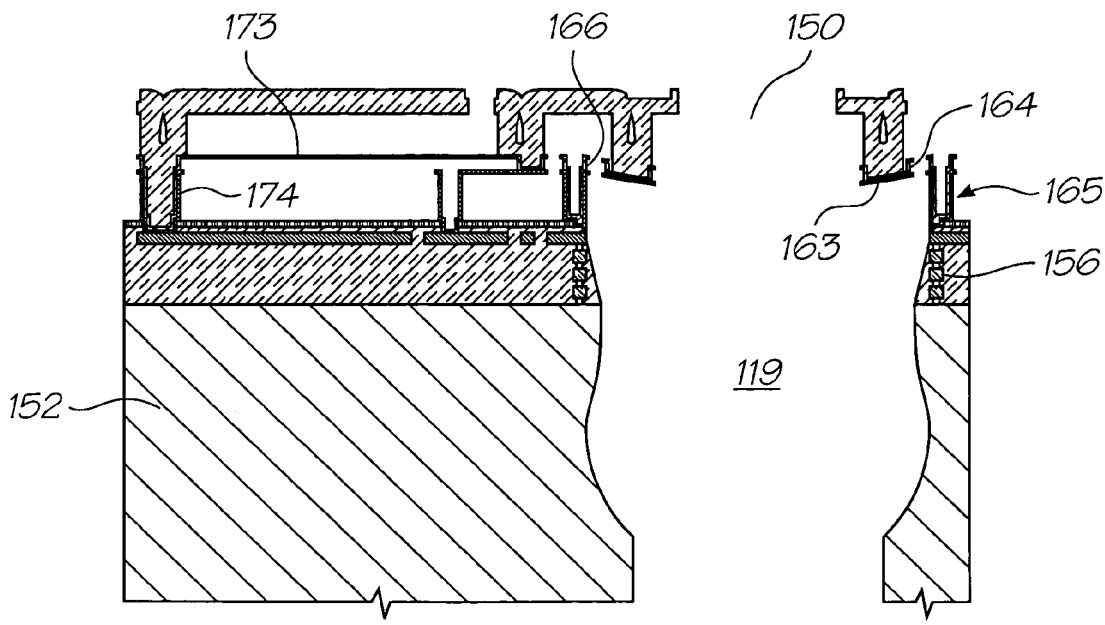
FIG. 24 shows a sectional elevation view of the nozzle of FIG. 22.
Figure 25:
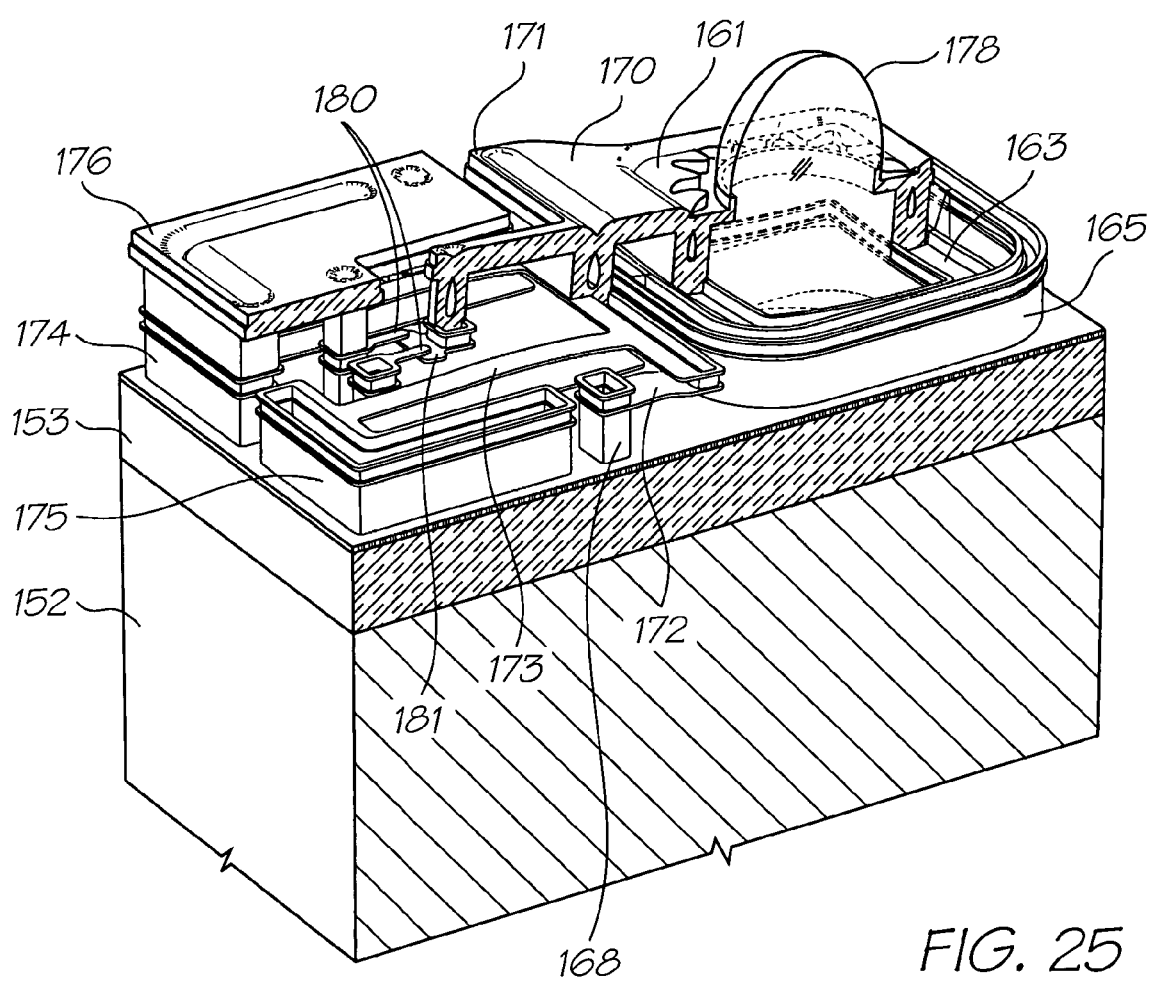
FIG. 25 shows in perspective a partial sectional view of the nozzle of FIG. 20.
Figure 26:
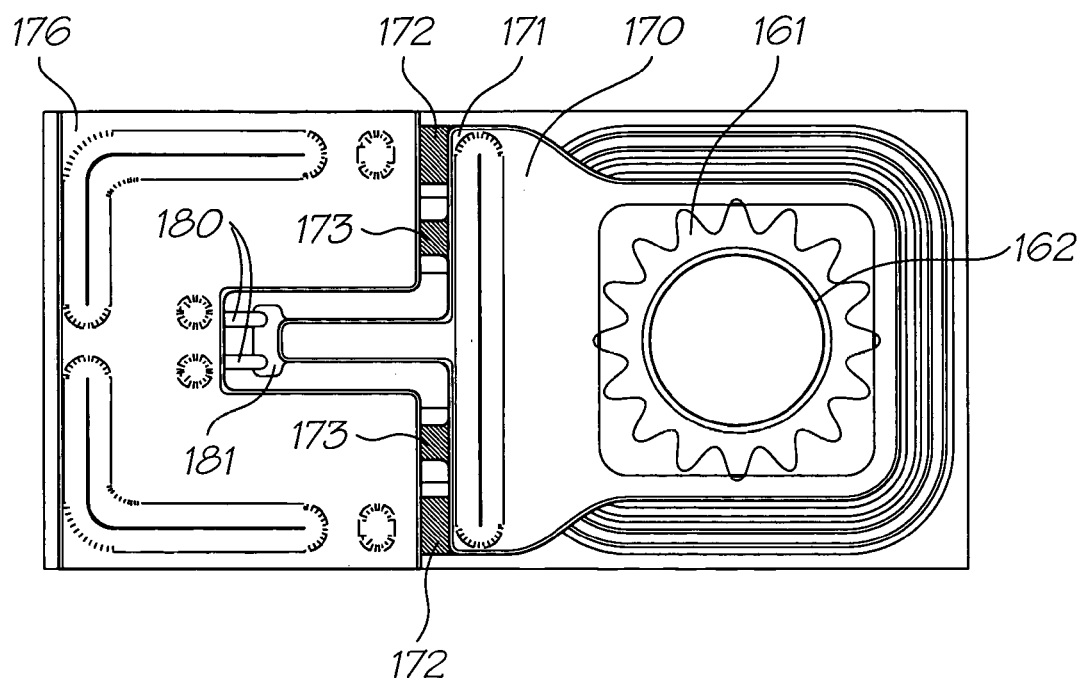
FIG. 26 shows a plan view of the nozzle of FIG. 19.
Figure 27:
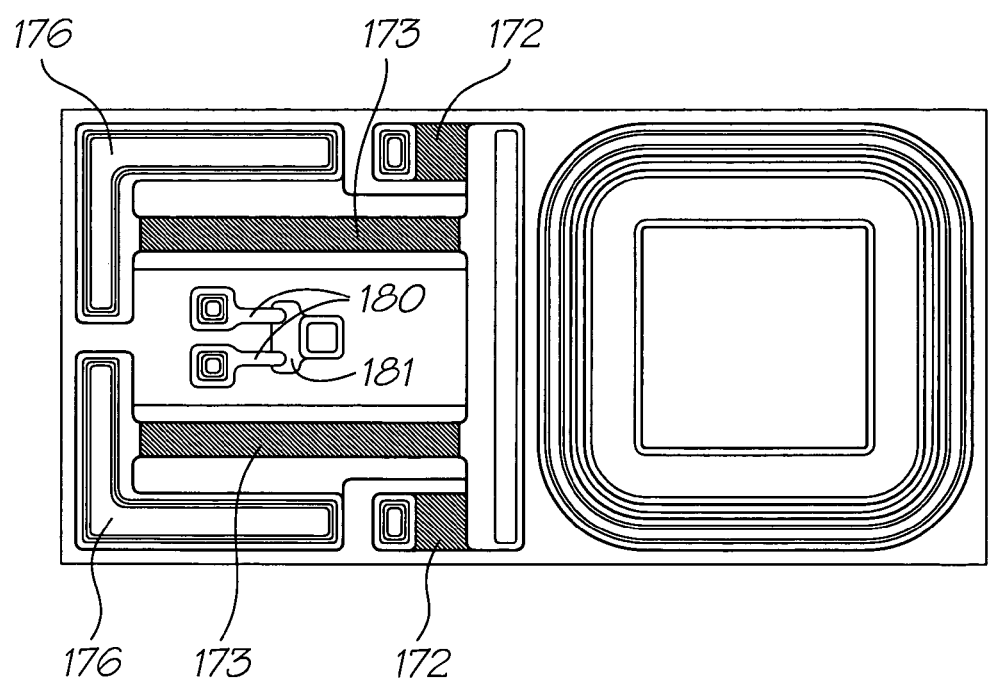
FIG. 27 shows a view similar to FIG. 26 but with lever arm and moveable nozzle portions omitted.

The nozzle wall 160 forms part of lever arrangement that is mounted to a carrier 168 having a generally U-shaped profile with a base 169 attached to the layer 157. The lever arrangement also includes a lever arm 170 that extends from the nozzle wall and incorporates a lateral stiffening beam 171. The lever arm 170 is attached to as pair of passive beams 172 that are formed from titanium nitride and are positioned at each side of the nozzle as best seen in FIGS. 22 and 25. The other ends of the passive beams 172 are attached to the carriers 168.

The lever arm 170 is also attached to an actuator beam 173, which is formed from TiN. This attachment to the actuator beam is made at a point a small but critical distance higher than the attachments to the passive beam 172.

As can best be seen from FIGS. 22 and 25, the actuator beam 173 is substantially U-shaped in plan, defining a current path between an electrode 174 and an opposite electrode 175. Each of the electrodes 174 and 175 is electrically connected to a respective point in the contact layer 154. The actuator beam 173 is also mechanically secured to an anchor 176, and the anchor 176 is configured to constrain motion of the actuator beam 173 to the left of FIGS. 19 to 21 when the nozzle arrangement is activated.

The actuator beam 807 is conductive, being composed of TiN, but has a sufficiently high enough electrical resistance to generate self-heating when a current is passed between the electrodes 174 and 175. No current flows through the passive beams 172, so they do experience thermal expansion.

In operation, the nozzle is filled with ink 177 that defines a meniscus 178 under the influence of surface tension. The ink is retained in the chamber 159 by the meniscus, and will not generally leak out in the absence of some other physical influence.

To fire ink from the nozzle, a current is passed between the contacts 174 and 175, passing through the actuator beam 173. The self-heating of the beam 173 causes the beam to expand, and the actuator beam 173 is dimensioned and shaped so that the beam expands predominantly in a horizontal direction with respect to FIGS. 19 to 21. The expansion is constrained to the left by the anchor 176, so the end of the actuator beam 173 adjacent the lever arm 170 is impelled to the right.

The relative horizontal inflexibility of the passive beams 172 prevents them from allowing much horizontal movement of the lever arm 170. However, the relative displacement of the attachment points of the passive beams and actuator beam respectively to the lever arm causes a twisting movement that, in turn, causes the lever arm 170 to move generally downwardly with a pivoting or hinging motion. However, the absence of a true pivot point means that rotation is about a pivot region defined by bending of the passive beams 172.

The downward movement (and slight rotation) of the lever arm 170 is amplified by the distance of the nozzle wall 160 from the passive beams 172.

Figure 20:
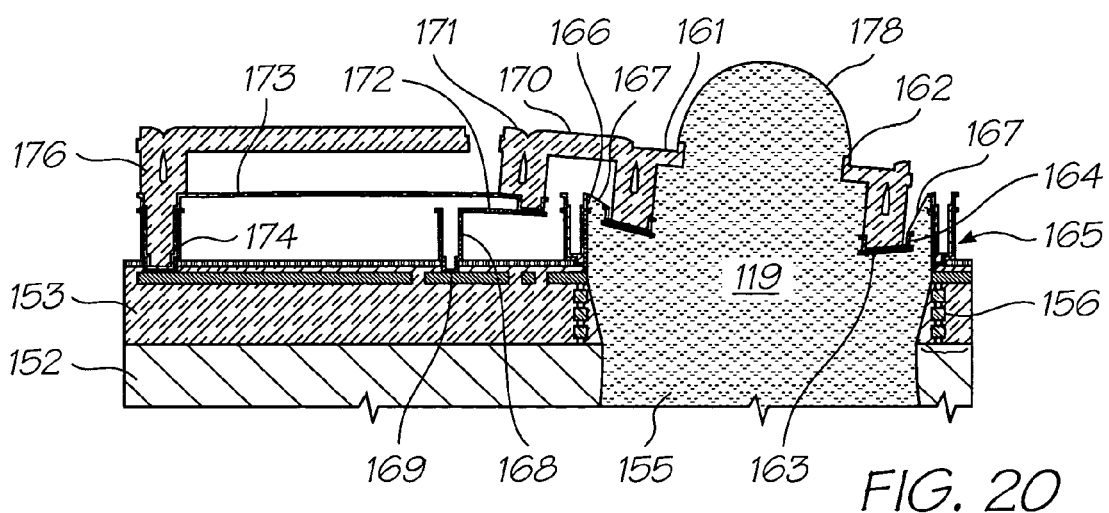
FIG. 20 shows a vertical section of a single nozzle in an initial activation state.

The downward movement of the nozzle walls and roof causes a pressure increase within the chamber 159, causing the meniscus 178 to bulge as shown in FIG. 20, although the surface tension of the ink causes the fluid seal 11 to be stretched by this motion without allowing ink to leak out.

Figure 21:
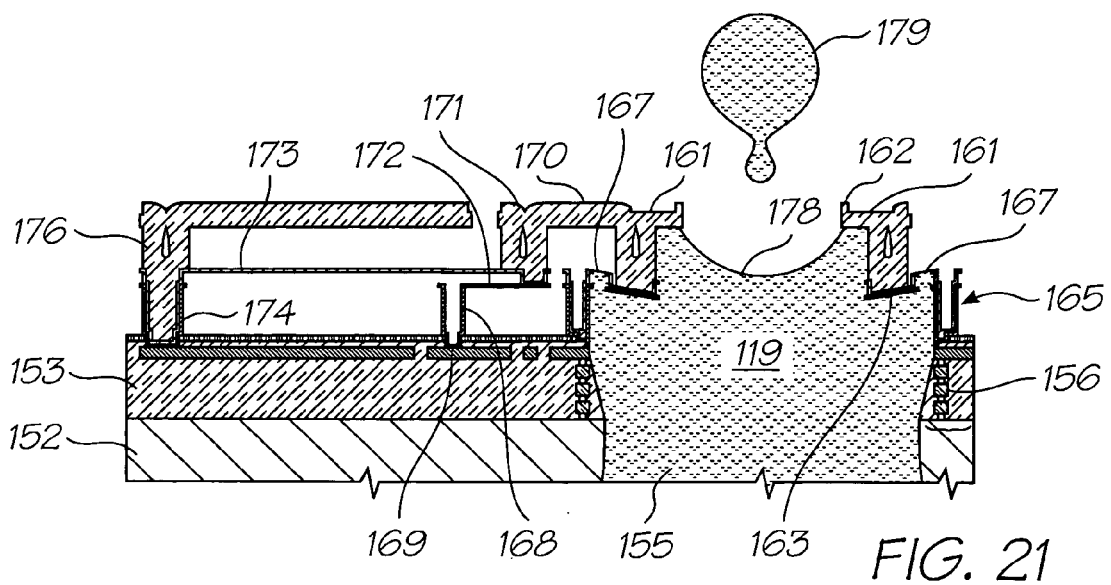
FIG. 21 shows a vertical section of a single nozzle in a later activation state.

As shown in FIG. 21, at the appropriate time the drive current is stopped and the actuator beam 173 quickly cools and contracts. The contraction causes the lever arm to commence its return to the quiescent position, which in turn causes a reduction in pressure in the chamber 159. The interplay of the momentum of the bulging ink and its inherent surface tension, and the negative pressure caused by the upward movement of the nozzle chamber 159 causes thinning, and ultimately snapping, of the bulging meniscus 178 to define an ink drop 179 that continues upwards until it contacts passing print media 75.

Immediately after the drop 179 detaches, the meniscus 178 forms the concave shape shown in FIG. 21. Surface tension causes the pressure in the chamber 159 to remain relatively low until ink has been sucked upwards through the inlet 155, which returns the nozzle arrangement and the ink to the quiescent situation shown in FIG. 19.

As can best be seen from FIG. 22, the print head chip 57 also incorporates a test mechanism that can be used both post-manufacture and periodically after the print head assembly has been installed. The test mechanism includes a pair of contacts 180 that are connected to test circuitry (not shown). A bridging contact 181 is provided on a finger 182 that extends from the lever arm 170. Because the bridging contact 181 is on the opposite side of the passive beams 172, actuation of the nozzle causes the bridging contact 181 to move upwardly, into contact with the contacts 180. Test circuitry can be used to confirm that actuation causes this closing of the circuit formed by the contacts 180 and 181. If the circuit is closed appropriately, it can generally be assumed that the nozzle is operative.

As stated previously the integrated circuits of the print head chips 57 are controlled by the print engine controller (PEC) integrated circuits of the drive electronics 62. One or more PEC integrated circuits 100 is or are provided (depending upon the printing speed required) in order to enable page-width printing over a variety of different sized pages or continuous sheets. As described previously, each of the printed circuit boards 63 carried by the support moulding 66 carries one PEC integrated circuit 190 (FIG. 25) which interfaces with four of the print head chips 57, and the PEC integrated circuit 190 essentially drives the integrated circuits of the print head chips 57 and transfers received print data thereto in a form suitable to effect printing.

An example of a PEC integrated circuit which is suitable for driving the print head chips is described in the Applicant's co-pending U.S. patent application Ser. Nos. 09/575,108, 09/575,109, 09/575,110, 09/607,985, 09/607,990, and 09/606,999, which are incorporated herein by reference. However, a brief description of the circuit is provided as follows with reference to FIGS. 28 to 30.

The data flow and functions performed by the PEC integrated circuit 190 are described for a situation where the PEC integrated circuit is provided for driving a print head assembly 50 an 51 having a plurality of print head modules 55, that is four modules as described above. As also described above, each print head module 55 provides for six channels of fluid for printing, these being:

Cyan, Magenta and Yellow (CMY) for regular colour printing;
Black (K) for black text and other black or greyscale printing;
Infrared (IR) for tag-enabled applications; and
Fixative (F) to enable printing at high speed.

Figure 28:
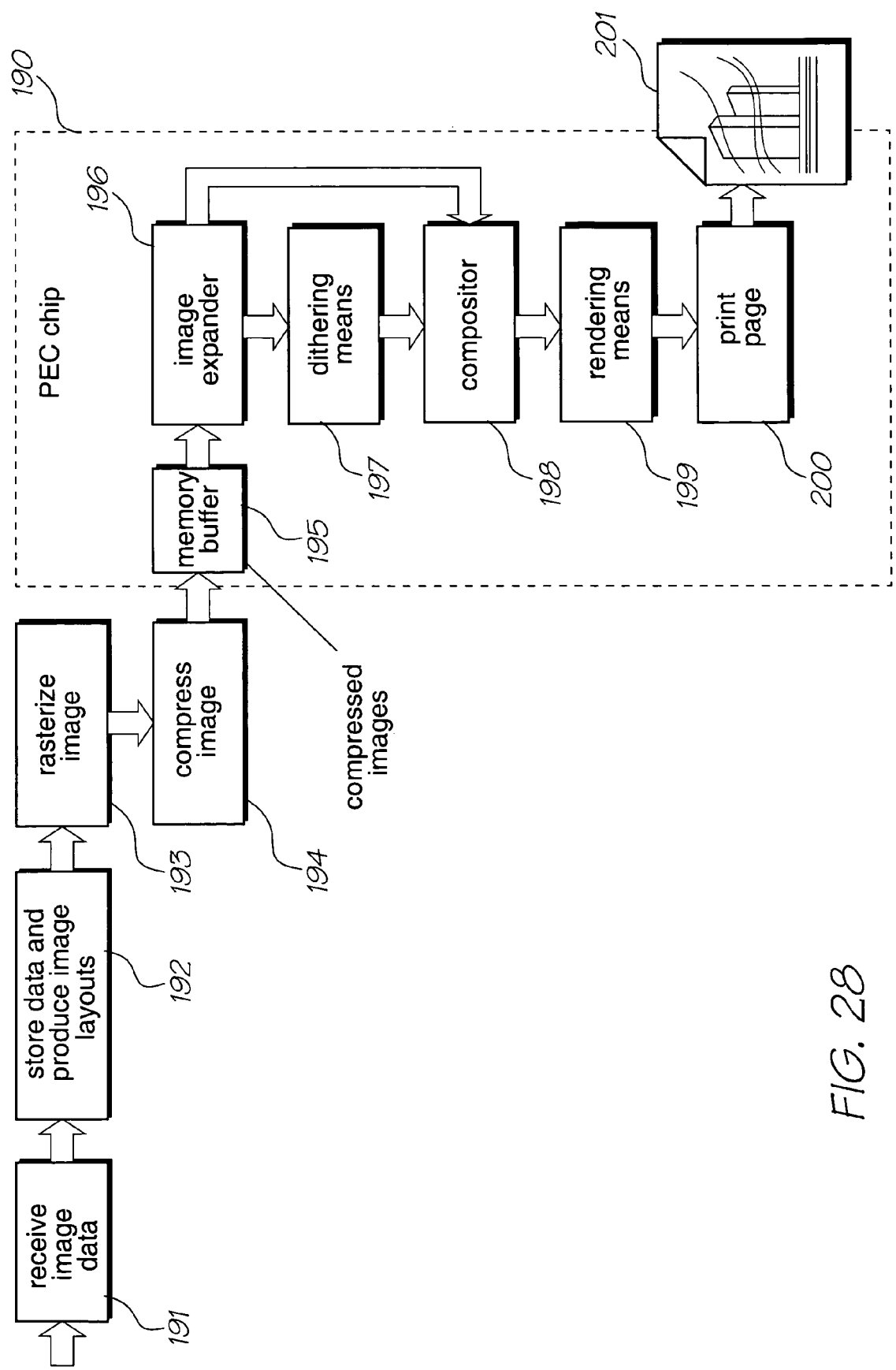
FIG. 28 illustrates data flow and functions performed by a print engine controller ("PEC") that forms one of the circuit components shown in FIG. 14.

As indicated in FIG. 28, photographic images are supplied to the PEC integrated circuit 190 by the computer 20, which is programmed to perform the various processing steps 191 to 194 involved in printing an image prior to transmission to the PEC integrated circuit 190. These steps will typically involve receiving the image data (step 191) and storing this data in a memory buffer of the computer system (step 192) in which photograph layouts may be produced and any required objects may be added. Pages from the memory buffer are rasterized (step 193) and are then compressed (step 194) prior to transmission to the PEC integrated circuit 190. Upon receiving the image data, the PEC integrated circuit 190 processes the data so as to drive the integrated circuits of the print head chips 57.

Due to the page-width nature of the printhead assembly of the present invention, each photographic image should be printed at a constant speed to avoid creating visible artifacts. This means that the printing speed should be varied to match the input data rate. Document rasterization and document printing are therefore decoupled to ensure the printhead assembly has a constant supply of data. In this arrangement, an image is not printed until it is fully rasterized and, in order to achieve a high constant printing speed, a compressed version of each rasterized page image is stored in memory.

Because contone colour images are reproduced by stochastic dithering, but black text and line graphics are reproduced directly using dots, the compressed image format contains a separate foreground bi-level black layer and background contone colour layer. The black layer is composited over the contone layer after the contone layer is dithered. If required, a final layer of tags (in IR or black ink) is optionally added to the image for printout.

Dither matrix selection regions in the image description are rasterized to a contone-resolution bi-lev bitmap which is losslessly compressed to negligible size and which forms part of the compressed image. The IR layer of the printed page optionally contains encoded tags at a programmable density.

Each compressed image is transferred to the PEC integrated circuit 190 where it is then stored in a memory buffer 195. The compressed image is then retrieved and fed to an image expander 196 in which images are retrieved. If required, any dither may be applied to any contone layer by a dithering means 197 and any black bi-level layer may be composited over the contone layer by a compositor 198 together with any infrared tags which may be rendered by the rendering means 199. The PEC integrated circuit 190 then drives the integrated circuits of the print head chips 57 to print the composite image data at step 200 to produce a printed (photograph) image 201.

The process performed by the PEC integrated circuit 190 may be considered to consist of a number of distinct stages. The first stage has the ability to expand a JPEG-compressed contone CMYK layer. In parallel with this, bi-level IR tag data can be encoded from the compressed image. The second stage dithers the contone CMYK layer using a dither matrix selected by a dither matrix select map and, if required, composites a bi-level black layer over the resulting bi-level K layer and adds the IR layer to the image. A fixative layer is also generated at each dot position wherever there is a need in any of the C, M, Y, K, or IR channels. The last stage prints the bi-level CMYK+IR data through the print head assembly 50 and/or 51.

Figure 29:
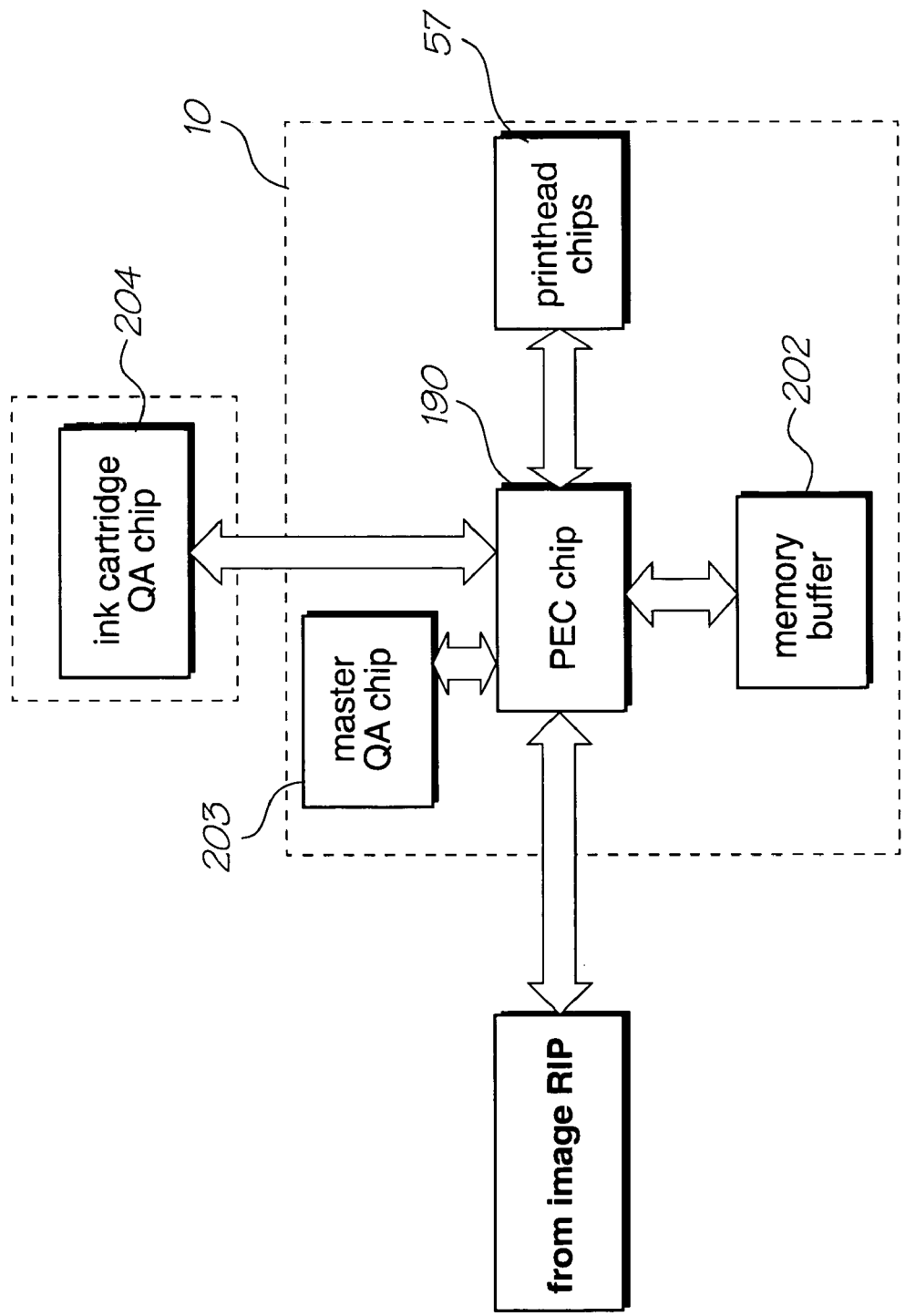
FIG. 29 illustrates the PEC of FIG. 28 in the context of an overall printing system architecture.

FIG. 29 shows the PEC integrated circuit 190 in the context of the overall printing system architecture. The various components of the architecture include:

The PEC integrated circuit 190 which is responsible for receiving the compressed page images for storage in a memory buffer 202, performing the page expansion, black layer compositing and sending the dot data to the print head chips 57. The PEC integrated circuit 190 may also communicate with a master Quality Assurance (QA) integrated circuit 203 and with an ink cartridge Quality Assurance (QA) integrated circuit 204. The PEC integrated circuit 190 also provides a means of retrieving the print head assembly characteristics to ensure optimum printing.

The memory buffer 202 for storing the compressed image and for scratch use during the printing of a given page. The construction and working of memory buffers is known to those skilled in the art and a range of standard integrated circuits and techniques for their use might be utilized.

The master integrated circuit 203 which is matched to the ink cartridge QA integrated circuit 204. The construction and working of QA integrated circuits is also known to those skilled in the art and a range of known QA processes might be utilized.

The PEC integrated circuit 190 of the present invention effectively performs four basic levels of functionality:

Receiving compressed pages via a serial interface such as an IEEE 1394.

Acting as a print engine for producing an image from a compressed form. The print engine functionality includes expanding the image, dithering the contone layer, compositing the black layer over the contone layer, optionally adding infrared tags, and sending the resultant image to the integrated circuits of the print head chips.

Acting as a print controller for controlling the print head chips 57 and the stepper motors 102, 108 and 111 of the printing system.

Serving as two standard low-speed serial ports for communication with the two QA integrated circuits. In this regard, two ports are used, and not a single port, so as to ensure strong security during authentication procedures.

These functions are now described in more detail with reference to FIG. 30, which provides a more specific, exemplary illustration of the PEC integrated circuit architecture.

The PEC integrated circuit 190 incorporates a simple micro-controller CPU core 204 to perform the following functions:

Perform QA integrated circuit authentication protocols via a serial interface 205 between print images.

Run the stepper motors 102, 108 and 111 of the printing system via a parallel interface 206 during printing to control delivery of the paper 75 to the printer for printing.

Synchronize the various components of the PEC integrated circuit 190 during printing.

Provide a means of interfacing with external data requests (programming registers, etc).

Provide a means of interfacing with the print head assemblies' low-speed data requests (such as reading characterization vectors and writing pulse profiles).

Provide a means of writing portrait and landscape tag structures to an external DRAM 207.

In order to perform the image expansion and printing process, the PEC integrated circuit 190 includes a high-speed serial interface 208 (such as a standard IEEE 1394 interface), a standard JPEG decoder 209, a standard Group 4 Fax decoder 210, a custom halftoner/compositor (HC) 211, a custom tag encoder 212, a line loader/formatter (LLF) 213, and a print head interface 214 (PHI) which communicates with the print head chips 57. The decoders 209 and 210 and the tag encoder 212 are buffered to the HC 211. The tag encoder 212 allocates infrared tags to images.

The print engine function works in a double-buffered manner. That is, one image is loaded into the external DRAM 207 via a DRAM interface 215 and a data bus 216 from the high-speed serial interface 208, while the previously loaded image is read from the DRAM 207 and passed through the print engine process. When the image has been printed, the image just loaded becomes the image being printed, and a new image is loaded via the high-speed serial interface 208.

At the aforementioned first stage, the process expands any JPEG-compressed contone (CMYK) layers, and expands any of two Group 4 Fax-compressed bi-level data streams. The two streams are the black layer and a matte for selecting between dither matrices for contone dithering. At the second stage, in parallel with the first, any tags are encoded for later rendering in either IR or black ink.

Finally, in the third stage the contone layer is dithered, and position tags and the bi-level spot layer are composited over the resulting bi-level dithered layer. The data stream is ideally adjusted to create smooth transitions across overlapping segments in the print head assembly and ideally it is adjusted to compensate for dead nozzles in the print head assemblies. Up to six channels of bi-level data are produced from this stage.

However, it will be understood that not all of the six channels need be activated. For example, the print head modules 55 may provide for CMY only, with K pushed into the CMY channels and IR ignored. Alternatively, the position tags may be printed in K if IR ink is not employed. The resultant bi-level CMYK-IR dot-data is buffered and formatted for printing with the integrated circuits of the print head chips 57 via a set of line buffers (not shown). The majority of these line buffers might be ideally stored on the external DRAM 207. In the final stage, the six channels of bi-level dot data are printed via the PHI 214.

The HC 211 combines the functions of half-toning the contone (typically CMYK) layer to a bi-level version of the same, and compositing the spot1 bi-level layer over the appropriate half-toned contone layer(s). If there is no K ink, the HC 211 functions to map K to CMY dots as appropriate. It also selects between two dither matrices on a pixel-by-pixel basis, based on the corresponding value in the dither matrix select map. The input to the HC 211 is an expanded contone layer (from the JPEG decoder 205) through a buffer 217, an expanded bi-level spot1 layer through a buffer 218, an expanded dither-matrix-select bitmap at typically the same resolution as the contone layer through a buffer 219, and tag data at full dot resolution through a buffer (FIFO) 220.

The HC 211 uses up to two dither matrices, read from the external DRAM 207. The output from the HC 211 to the LLF 213 is a set of printer resolution bi-level image lines in up to six colour planes. Typically, the contone layer is CMYK or CMY, and the bi-level spot1 layer is K. Once started, the HC 211 proceeds until it detects an "end-of-image" condition, or until it is explicitly stopped via a control register (not shown).

The LLF 213 receives dot information from the HC 211, loads the dots for a given print line into appropriate buffer storage (some on integrated circuit (not shown) and some in the external DRAM 207) and formats them into the order required for the integrated circuits of the print head chips 57. More specifically, the input to the LLF 213 is a set of six 32-bit words and a Data Valid bit, all generated by the HC 211.

As previously described, the physical location of the nozzles 150 on the print head chips is in two offset rows 151, which means that odd and even dots of the same colour are for two different lines. In addition, there is a number of lines between the dots of one colour and the dots of another. Since the six colour planes for the same dot position are calculated at one time by the HC 211, there is a need to delay the dot data for each of the colour planes until the same dot is positioned under the appropriate colour nozzle. The size of each buffer line depends on the width of the print head assembly. A single PEC integrated circuit 190 may be employed to generate dots for up to 16 print head chips 57 and, in such case, a single odd or even buffer line is therefore 16 sets of 640 dots, for a total of 10,240 bits (1280 bytes).

The PHI 214 is the means by which the PEC integrated circuit 190 loads the print head chips 57 with the dots to be printed, and controls the actual dot printing process. It takes input from the LLF 213 and outputs data to the print head chips 57. The PHI 214 is capable of dealing with a variety of print head assembly lengths and formats.

A combined characterization vector of each print head assembly 50 and 51 can be read back via the serial interface 205. The characterization vector may include dead nozzle information as well as relative printhead module alignment data. Each printhead module can be queried via a low-speed serial bus 221 to return a characterization vector of the printhead module.

The characterization vectors from multiple printhead modules can be combined to construct a nozzle defect list for the entire printhead assembly and allows the PEC integrated circuit 190 to compensate for defective nozzles during printing. As long as the number of defective nozzles is low, the compensation can produce results indistinguishable from those of a printhead assembly with no defective nozzles.

It will be understood that the broad constructional and operating principles of the photofinishing system of the present invention may be realised with various embodiments. Thus, variations and modifications may be made in respect of the embodiments as specifically described above by way of example.

What is claimed is:

1. A printing system which comprises:
   a support arrangement;
   a print cartridge receiving arrangement mounted on the support arrangement to engage a print cartridge;
   a drive mechanism for driving a delivery mechanism of the print cartridge for delivering print media from the print cartridge;
   a print engine mounted on the support arrangement downstream of the print cartridge and having a pair of opposed printhead assemblies that are configured to perform double-sided printing on print media fed from the print cartridge between the printhead assemblies; and
   a slitter mounted on the support arrangement downstream of the print engine and configured to separate the print media into sheets;
   wherein the slitter may be driven to cut different width prints from a single width supply of print media.

2. A printing system as claimed in claim 1, in which the support arrangement includes a cabinet arrangement in which components of to printing system are positioned.

3. A printing system as claimed in claim 1, in which the print cartridge receiving arrangement is configured so that a print cartridge incorporating a roll of the print media and a supply of printing fluid can be releasably engaged with the printing system.

4. A printing system as claimed in claim 1, in which each printhead assembly includes a number of printhead modules, each printhead module including a fluid distribution arrangement and at least one printhead chip mounted on to fluid distribution arrangement to receive fluid from to arrangement.

5. A printing system as claimed in claim 4, in which each printhead module comprises a support member on which the fluid distribution arrangements are mounted and at least four micro-electromechanical integrated circuit printhead chips.

6. A printing system as claimed in claim 5, which includes a digital processor that is arranged to receive digitised data that is representative of a photographic image and to process the data in a manner to generate a printer drive signal that is representative of the photographic image, the printhead assemblies being coupled to the digital processor and being arranged to process the drive signal and effect printing of the photographic image on the print media.

7. A printing system as claimed in claim 4 wherein the support arrangement includes a casing, each printhead module being removably located in a channel portion of the casing and wherein the casing contains electrical circuitry for controlling delivery of electrical power and drive signals to the printhead chips.

* * * * *